United States Patent
Noh et al.

(10) Patent No.: US 12,225,560 B2
(45) Date of Patent: Feb. 11, 2025

(54) RESOURCE ALLOCATION METHOD FOR PERFORMING TRANSMISSION IN UNLICENSED BAND, AND DEVICE USING SAME

(71) Applicant: WILUS INSTITUTE OF STANDARDS AND TECHNOLOGY INC., Gyeonggi-do (KR)

(72) Inventors: Minseok Noh, Seoul (KR); Kyungjun Choi, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 421 days.

(21) Appl. No.: 17/489,729

(22) Filed: Sep. 29, 2021

(65) Prior Publication Data

US 2022/0124698 A1     Apr. 21, 2022

Related U.S. Application Data

(63) Continuation of application No. PCT/KR2020/095055, filed on Mar. 30, 2020.

(30) Foreign Application Priority Data

Mar. 30, 2019  (KR) .................. 10-2019-0037511
Apr. 3, 2019   (KR) .................. 10-2019-0039285

(51) Int. Cl.
*H04W 72/51* (2023.01)
*H04L 1/1607* (2023.01)
(Continued)

(52) U.S. Cl.
CPC .......... *H04W 72/51* (2023.01); *H04L 1/1614* (2013.01); *H04W 72/044* (2013.01);
(Continued)

(58) Field of Classification Search
None
See application file for complete search history.

(56) References Cited

U.S. PATENT DOCUMENTS 10,362,574 B2   7/2019  Chendamarai Kannan et al.
10,455,582 B1  10/2019  Li et al.
(Continued)

FOREIGN PATENT DOCUMENTS

CN   107113787   8/2017
CN   107667565   2/2018
(Continued)

OTHER PUBLICATIONS

Notice of Allowance dated Dec. 13, 2023 for European Patent Application No. 20 784 589.2.
(Continued)

*Primary Examiner* — Srinivasa R Reddivalam
(74) *Attorney, Agent, or Firm* — Womble Bond Dickinson (US) LLP

(57) ABSTRACT

The present invention provides: a resource allocation method for uplink transmission onto an unlicensed band in a wireless communication system, particularly, in cellular wireless communication system; and a method, a device, and a system for transmitting scheduling information in a base station and for performing reception and transmission in a terminal. In addition, provided are: a method for efficiently transmitting a signal in a wireless communication system, particularly, in a cellular wireless communication system; and a device therefor, and another objective of the present invention is to provide: a method for efficiently sensing a channel and transmitting a signal/channel in a specific frequency band (for example, unlicensed band); a method for receiving the corresponding signal/channel; and a device therefor.

19 Claims, 24 Drawing Sheets

(51) Int. Cl.
  H04W 72/044  (2023.01)
  H04W 72/1263  (2023.01)
  H04W 72/23  (2023.01)
  H04W 72/56  (2023.01)
  H04W 74/0816  (2024.01)
(52) U.S. Cl.
  CPC ....... *H04W 72/1263* (2013.01); *H04W 72/23* (2023.01); *H04W 72/56* (2023.01); *H04W 74/0816* (2013.01)

(56) References Cited

U.S. PATENT DOCUMENTS

| | | | |
|---|---|---|---|
| 2019/0082431 | A1 | 3/2019 | Yi et al. |
| 2021/0368507 | A1* | 11/2021 | Kuang ................. H04W 72/23 |
| 2022/0131666 | A1* | 4/2022 | Iwai ...................... H04L 5/0094 |
| 2023/0026357 | A1* | 1/2023 | Lei ........................ H04L 5/0092 |
| 2024/0064806 | A1* | 2/2024 | Fu ....................... H04L 41/0896 |

FOREIGN PATENT DOCUMENTS

| | | |
|---|---|---|
| EP | 3 858 078 | 8/2021 |
| KR | 10-2013-0049695 | 5/2013 |
| KR | 10-2019-0009813 | 1/2019 |
| KR | 10-2262728 | 6/2021 |
| WO | 2012/023819 | 2/2012 |
| WO | 2016/070417 | 5/2016 |
| WO | 2017/164664 | 9/2017 |
| WO | 2018/030864 | 2/2018 |
| WO | 2019/015590 | 1/2019 |
| WO | 2020/065630 | 4/2020 |
| WO | 2020/198965 | 10/2020 |
| WO | 2020/204682 | 10/2020 |

OTHER PUBLICATIONS

Extended European Search Report dated Dec. 18, 2023 for European Patent Application No. 23209922.6.
Office Action dated Jan. 22, 2024 for Japanese Patent Application No. 2021-558795 and its English translation provided by Applicant's foreign counsel.
Decision to Reject the Amendments dated Jan. 22, 2024 for Japanese Patent Application No. 2021-558795 and its English translation provided by Applicant's foreign counsel.
Office Action dated Mar. 30, 2022 for Indian Patent Application No. 202127046956.
International Preliminary Report on Patentability (Chapter I) for PCT/KR2020/095055 issued on Sep. 28, 2021 and its English translation from WIPO (now published as WO 2020/204682).
Office Action dated Sep. 13, 2023 for Vietnamese Patent Application No. 1-2021-06928 and its English translation provided by Applicant's foreign counsel.
Office Action dated Oct. 20, 2023 for Chinese Patent Application No. 202080032655.0 and its English translation provided by Applicant's foreign counsel.
MCC TF160, Motorola Mobility: "Default NR TBS Tables for SIG test cases", 3GPP TSG-RAN WG5 Meeting #81, R5-186727, Spokane, USA, Nov. 2, 2018, pp. 1-75.
International Search Report for PCT/KR2020/095055 mailed on Jul. 8, 2020 and its English translation from WIPO (now published as WO 2020/204682).
Written Opinion of the International Searching Authority for PCT/KR2020/095055 mailed on Jul. 8, 2020 and its English translation by Google Translate (now published as WO 2020/204682).
Huawei et al.: "HARQ enhancements in NR unlicensed", R1-1901527, 3GPP TSG WG1 Meeting #96, Athens, Greece, Feb. 15, 2019. See pp. 1-11 and figure 2.
Spreadtrum Communications: "Discussion on UL Signals and Channels in NR-U", R1-1904774, 3GPP TSG RAN WG1 #96bis, Xi'an, China, Mar. 29, 2019. See pp. 1-5.
Ericsson et al.: "Edge PRB restriction for flexible starting PUSCH PRB for LTE-MTC", R1-1903162, 3GPP TSG RAN WG1 Meeting #96, Athens, Greece, Feb. 15, 2019. See pp. 1-3.
CAICT: "Discussions on UL signals and channels design in NR-U", R1-1901123, 3GPP TSG RAN WG1 Ad-Hoc Meeting 1901, Taipei, Jan. 11, 2019. See pp. 1-4.
Extended European Search Report dated Oct. 14, 2022 for European Patent Application No. 20784589.2.
Samsung: "Uplink signal and channel design for NR-U", 3GPP TSG RAN WG1 #96, R1-1902256, Athens, Greece, Feb. 25-Mar. 1, 2019, pp. 1-6.
Office Action dated Nov. 14, 2022 for Japanese Patent Application No. 2021-558795 and its English translation provided by Applicant's foreign counsel.
Panasonic: "NR-U UL signals and channels", 3GPP TSG RAN WG1 #96bis, R1-1904594, Xi'an, China, Apr. 8-12, 2019, pp. 1-10.
3GPP TS 36.213 V15.5.0, "3$^{rd}$ Generation Partnership Project; Technical Specification Group Radio Access Network; Evolved Universal Terrestrial Radio Access (E-UTRA); Physical layer procedures (Release 15)", Mar. 2019, pp. 1-4.
Huawei, HiSilicon: "Scheduling of multiple transport blocks", 3GPP TSG RAN WG1 Meeting #96, R1-1901510, Athens, Greece, Feb. 25-Mar. 1, 2019, pp. 1-10.
WILUS Inc.: "Wideband operation for NR-unlicensed", 3GPP TSG RAN WG1 #97, R1-1907383, Reno, USA, May 13-17, 2019, pp. 1-6.
Office Action dated Jul. 24, 2023 for Japanese Patent Application No. 2021-558795 and its English translation provided by Applicant's foreign counsel.
Hearing Notice dated Mar. 4, 2024 for Indian Patent Application No. 202127046956.
Office Action dated Apr. 10, 2024 for Chinese Patent Application No. 202080032655.0 and its English translation provided by Applicant's foreign counsel.
Office Action dated Jul. 22, 2024 for Korean Patent Application No. 10-2021-7034608 and its English translation provided by Applicant's foreign counsel.
Notice of Allowance dated Jul. 19, 2024 for Chinese Patent Application No. 202080032655.0 and its English translation provided by Applicant's foreign counsel.
Notice of Allowance dated Jul. 29, 2024 for Japanese Patent Application No. 2021-558795 and its English translation provided by Applicant's foreign counsel.
Office Action dated Sep. 30, 2024 for European Patent Application No. 23 209 922.6.

* cited by examiner (a)

(b)

RESOURCE ALLOCATION METHOD FOR PERFORMING TRANSMISSION IN UNLICENSED BAND, AND DEVICE USING SAME

CROSS-REFERENCE TO RELATED APPLICATIONS

The present application is a continuation of International Patent Application No. PCT/KR2020/095055 filed on Mar. 30, 2020, which claims the priority to Korean Patent Application No. 10-2019-0037511 filed in the Korean Intellectual Office on Mar. 30, 2019, and Korean Patent Application No. 10-2019-0039285 filed in the Korean Intellectual Office on Apr. 3, 2019, the entire contents of which are incorporated herein by reference.

TECHNICAL FIELD

The present disclosure relates to a method of allocating uplink resources when a frame structure and a system based on NR are used in an unlicensed band, a method of transmitting resource allocation information by a base station, and a method, an apparatus, and a system for reception and transmission by a UE.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In recent years, with the explosion of mobile traffic due to the spread of smart devices, it is becoming difficult to cope with the increasing data usage for providing cellular communication services using only the existing licensed frequency spectrums or licensed frequency bands.

In such a situation, a method of using an unlicensed frequency spectrum or an unlicensed frequency band (e.g., 2.4 GHz band, 5 GHz band, 6 GHz band, 52.6 GHz or higher band, or the like) for providing cellular communication services is being discussed as a solution to the problem of lack of spectrum.

Unlike in licensed bands in which telecommunications carriers secure exclusive use rights through procedures such as auctions, in unlicensed bands, multiple communication devices may be used simultaneously without restrictions on the condition that only a certain level of adjacent band protection regulations are observed. For this reason, when an unlicensed band is used for cellular communication service, it is difficult to guarantee the communication quality to the level provided in the licensed band, and it is likely that interference with existing wireless communication devices (e.g., wireless LAN devices) using the unlicensed band occurs.

In order to use LTE and NR technologies in unlicensed bands, research on coexistence with existing devices for unlicensed bands and efficient sharing of wireless channels with other wireless communication devices is to be conducted in advance. That is, it is required to develop a robust coexistence mechanism (RCM) such that devices using LTE and NR technologies in the unlicensed band do not affect the existing devices for unlicensed bands.

DISCLOSURE OF INVENTION

Technical Problem

An aspect of the present disclosure is to provide an uplink channel access method when a wideband operation is performed in an unlicensed band in a wireless communication system, particularly, a cellular wireless communication system, and a method, an apparatus, and a system for transmission and reception by the UE. Another aspect of the present disclosure is to provide a method of efficiently transmitting a signal in a wireless communication system, particularly, a cellular wireless communication system and an apparatus for the same. Yet another aspect of the present disclosure is to provide a method of efficiently sensing a channel in a specific frequency band (for example, unlicensed band) and transmitting a signal/channel, a method of receiving the corresponding signal/channel, and an apparatus for the same.

The technical subjects pursued in the present disclosure may not be limited to the above mentioned technical subjects, and other technical subjects which are not mentioned may be clearly understood, through the following descriptions, by those skilled in the art of the present disclosure.

Solution to Problem

A UE in a wireless communication system according to an embodiment of the present disclosure includes: a communication module; and a processor configured to control the communication module. The processor is configured to receive Downlink Control Information (DCI) for allocating at least one subband for transmitting a PUSCH (Physical Uplink Shared Channel) and a plurality of resource blocks from a base station and transmit the PUSCH to the base station through the plurality of resource blocks received through the DCI, wherein the DCI includes first resource allocation information related to locations of the at least one subband and second resource allocation information related to locations of the plurality of resource blocks, the at least one subband is included in an activated bandwidth part (BWP), based on the first resource allocation information, and the plurality of resource blocks have an interlaced structure in which the resource blocks are continuously allocated to the activated BWP at regular intervals, based on the second resource allocation information.

In the present disclosure, the at least one subband is continuously allocated within the activated BWP, based on the first resource allocation information.

In the present disclosure, the first resource allocation information related to the locations of the at least one subband is included in the DCI through an RIV (Resource Indication Value) scheme.

In the present disclosure, the second resource allocation information related to the locations of the plurality of resource blocks is included in the DCI through a bitmap scheme or an RIV (Resource Indication Value) scheme according to subcarrier spacing.

In the present disclosure, when the subcarrier spacing is 30 khz, the second resource allocation information related to the locations of the plurality of resource blocks is included in the DCI through the bitmap scheme, and the locations of the plurality of resource blocks are indicated by bit values included in the second resource allocation information, based on the bitmap scheme.

In the present disclosure, when the subcarrier spacing is 15 khz, the second resource allocation information related to the locations of the plurality of resource blocks is included in the DCI through the RIV scheme, and the second resource allocation information includes start indexes of the plurality of resource blocks and a number of plurality of resource blocks, based on the RIV scheme.

In the present disclosure, the first resource allocation includes start locations and a number of at least one subband.

In the present disclosure, the first resource allocation information and the second resource allocation information are encoded together and included in the DCI.

In the present disclosure, indication information in which the first resource allocation information and the second resource allocation information are encoded together is sequentially calculated in an ascending order by giving a priority to one of the number of at least one subband or start indexes of the plurality of resource blocks.

In the present disclosure, the plurality of resource blocks have the interlaced structure over the at least one subband in which an LBT (Listen Before Talk) operation for channel access in an unlicensed band is performed.

The present disclosure provides a method including: receiving Downlink Control Information (DCI) for allocating at least one subband for transmitting a PUSCH (Physical Uplink Shared Channel) and a plurality of resource blocks from a base station; and transmitting the PUSCH to the base station through the plurality of resource blocks received through the DCI, wherein the DCI includes first resource allocation information related to locations of the at least one subband and second resource allocation information related to locations of the plurality of resource blocks, the at least one subband is included in an activated bandwidth part (BWP), based on the first resource allocation information, and the plurality of resource blocks have an interlaced structure in which the resource blocks are continuously allocated to the activated BWP at regular intervals, based on the second resource allocation information.

The present disclosure provides a base station including: a communication module; and a processor configured to control the communication module, wherein the processor is configured to transmit Downlink Control Information (DCI) for allocating at least one subband for transmitting a PUSCH (Physical Uplink Shared Channel) and a plurality of resource blocks to a UE, receive the PUSCH to the base station through the plurality of resource blocks received through the DCI, wherein the DCI includes first resource allocation information related to locations of the at least one subband and second resource allocation information related to locations of the plurality of resource blocks, the at least one subband is included in an activated bandwidth part (BWP), based on the first resource allocation information, and the plurality of resource blocks have an interlaced structure in which the resource blocks are continuously allocated to the activated BWP at regular intervals, based on the second resource allocation information.

Advantageous Effects of Invention

According to various embodiments of the present disclosure, a method and an apparatus for reception and transmission are provided when resource allocation for uplink transmission is performed in a wireless communication system, particularly, a cellular wireless communication system. Further, a method for accessing a channel in a specific frequency band (for example, unlicensed band) and efficiently transmitting a signal, and an apparatus for the same are provided.

The effects obtainable in the present disclosure are not limited to the above-mentioned effects, and other effects that are not mentioned above may be clearly understood by those of ordinary skill in the art from the following description

BEST MODE FOR CARRYING OUT THE INVENTION

Figure 1:
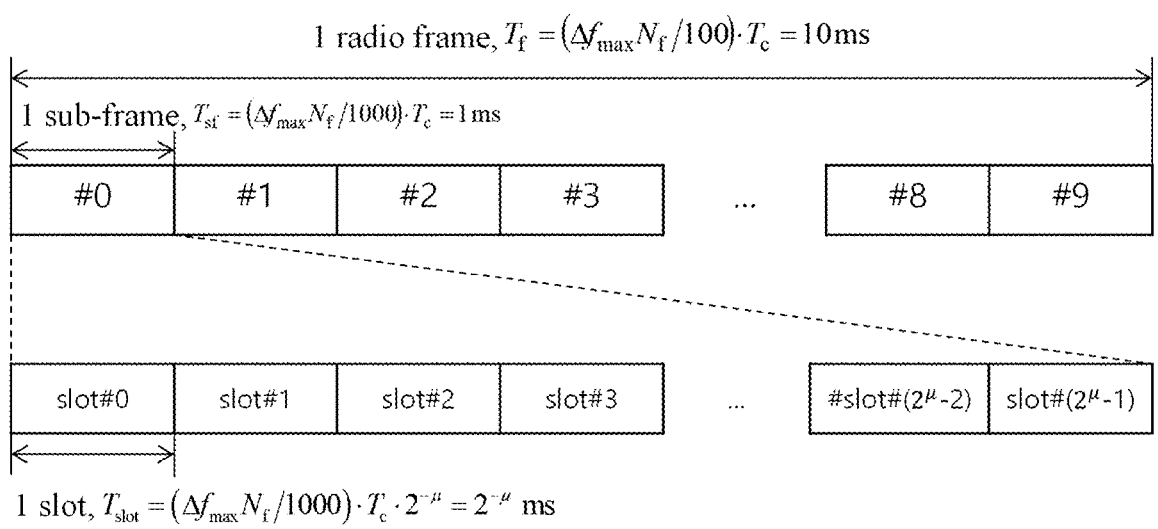
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100$)*$T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
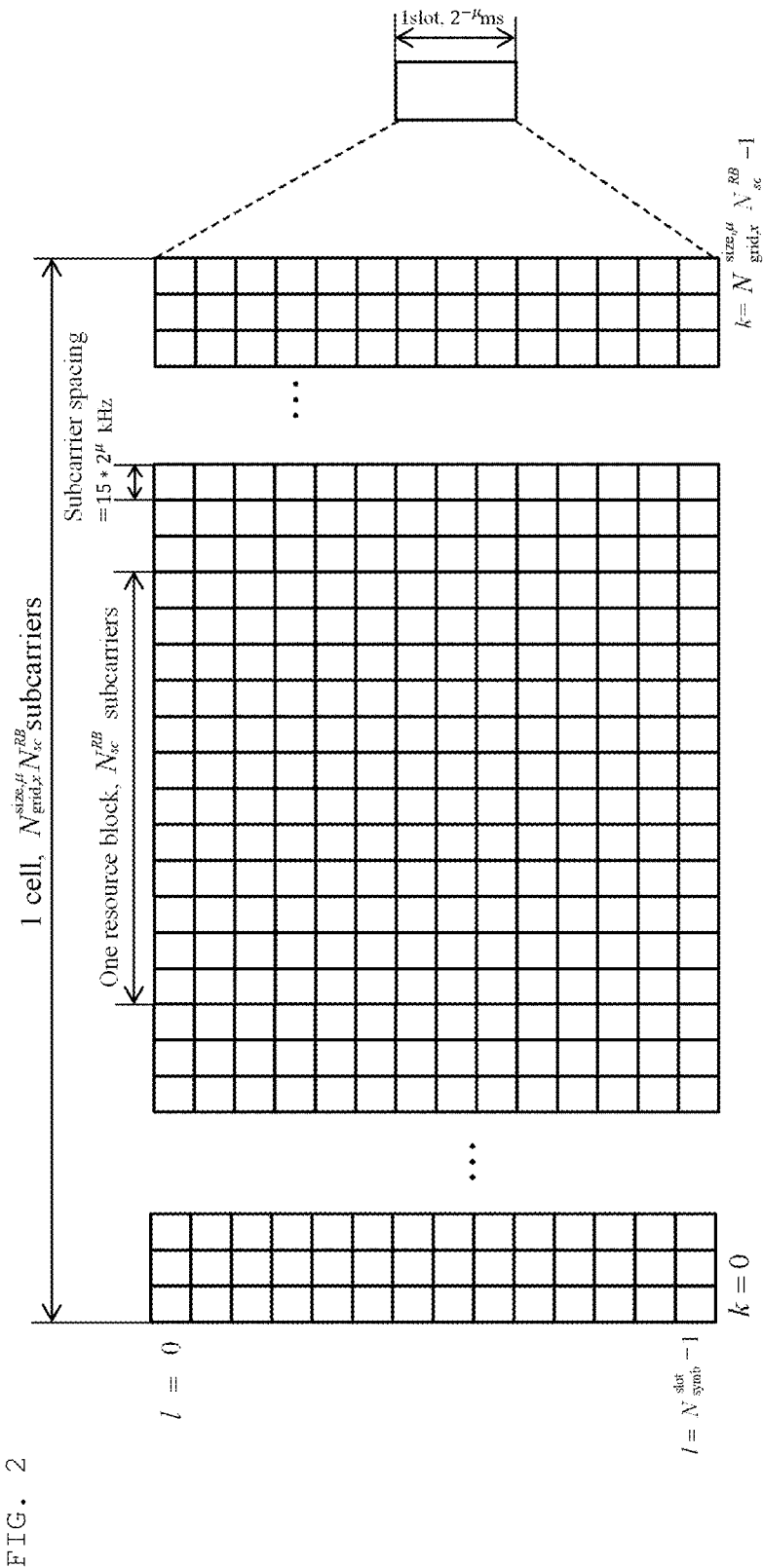
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to as simply symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 | index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | X | X | X | U | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | D | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | X | X | X | U | U | U | U | U | U | U | U | U | U |
| 14 | X | X | X | X | X | U | U | U | U | U | U | U | U | U | 42 | D | D | X | X | X | U | U | U | U | U | U | U | U | U |
| 15 | X | X | X | X | X | X | U | U | U | U | U | U | U | U | 43 | D | D | D | D | D | D | D | D | X | X | X | X | U |
| 16 | D | X | X | X | X | X | X | X | X | X | X | X | X | X | 44 | D | D | D | D | D | D | X | X | X | X | X | U | U |
| 17 | D | D | X | X | X | X | X | X | X | X | X | X | X | X | 45 | D | D | D | D | D | X | X | U | U | U | U | U | U |
| 18 | D | D | D | X | X | X | X | X | X | X | X | X | X | X | 46 | D | D | D | D | X | U | D | D | D | D | D | X | U |
| 19 | D | X | X | X | X | X | X | X | X | X | X | X | X | U | 47 | D | D | X | U | U | U | U | D | D | X | U | U | U |
| 20 | D | D | X | X | X | X | X | X | X | X | X | X | X | U | 48 | D | X | U | U | U | U | D | X | U | U | U | U | U |
| 21 | D | D | D | X | X | X | X | X | X | X | X | X | X | U | 49 | D | D | D | X | X | U | D | D | D | X | X | U |
| 22 | D | X | X | X | X | X | X | X | X | X | X | X | U | U | 50 | D | D | X | X | U | U | D | D | X | X | U | U | U |
| 23 | D | D | X | X | X | X | X | X | X | X | X | X | U | U | 51 | D | X | X | U | U | U | D | X | X | U | U | U | U |
| 24 | D | D | D | X | X | X | X | X | X | X | X | X | U | U | 52 | D | X | X | X | X | U | D | X | X | X | X | U |
| 25 | D | X | X | X | X | X | X | X | X | X | X | U | U | U | 53 | D | X | X | X | U | D | D | X | X | X | X | U |
| 26 | D | D | X | X | X | X | X | X | X | X | U | U | U | U | 54 | X | X | X | X | X | D | D | D | D | D | D |
| 27 | D | D | D | X | X | X | X | X | X | X | U | U | U | U | 55 | D | D | X | X | X | U | U | D | D | D | D | D |
| 56~255 | | | | | | | | | | | | | | | Reserved | | | | | | | | | | | | | | |

In Table 1, D denotes a DL symbol, U denotes a UL symbol, and X denotes a flexible symbol. As shown in Table 1, Up to two DL/UL switching in one slot may be allowed.

from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
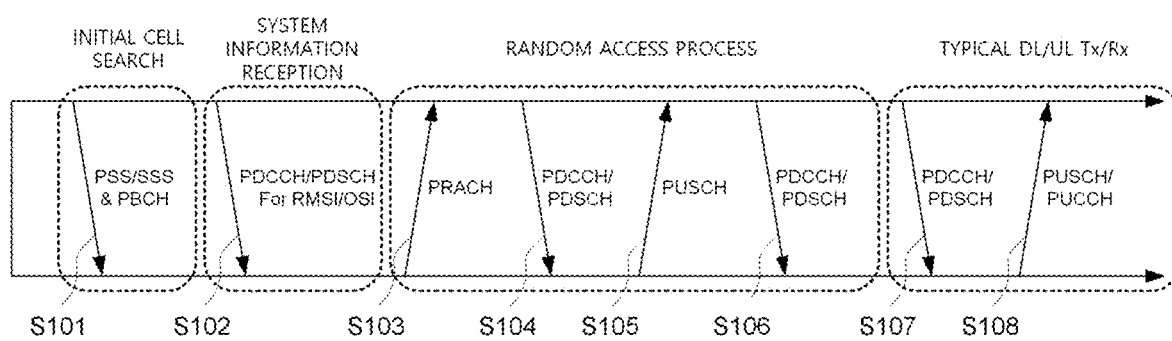
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (step S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (step S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (steps S103 to S106). First, the UE can transmit a preamble through a physical random access channel (PRACH) (step S103) and receive a response message for the preamble from the base station through the PDCCH and the corresponding PDSCH (step S104). When a valid random access response message is received by the UE, the UE transmits data including the identifier of the UE and the like to the base station through a physical uplink shared channel (PUSCH) indicated by the UL grant transmitted through the PDCCH from the base station (step S105). Next, the UE waits for reception of the PDCCH as an indication of the base station for collision resolution. If the UE successfully receives the PDCCH through the identifier of the UE (step S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (step S107) and transmits a physical uplink shared channel (PUSCH)/physical uplink control channel (PUCCH) (step S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
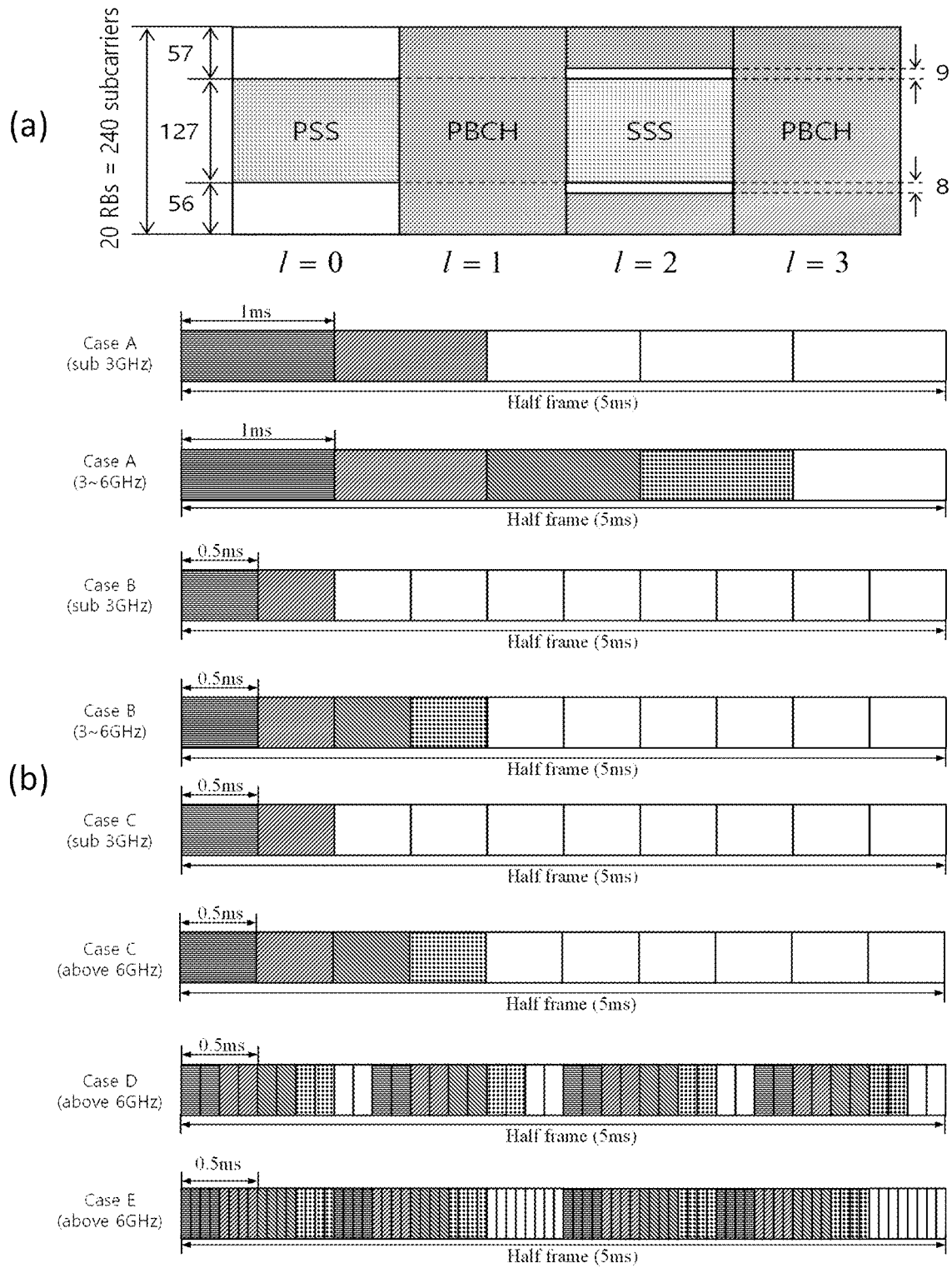
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4(a), a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4(a) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N^{(2)}_{ID}) \bmod 127$$

$$0 \le n < 127$$

Here, x(i+7)=(x(i+4)+x(i))mod 2 and is given as $$N = \lfloor N^{UL}_{RB}/10 \rfloor, i = 0, 1, \ldots 9 \qquad \text{[Equation 4]}$$

Further, the sequence $d_{SSS}(n)$ of the SSS is as follows.

$$[x(6)\ x(5)\ x(4)\ x(3)\ x(2)\ x(1)\ x(0)] = [1\ 1\ 1\ 0\ 1\ 1\ 0]$$

Here, $x_1(i+7)=(x_1(i+1)+x_1(i))\bmod 2$ and is given as $$\begin{aligned} &\text{if } (L-1) \le \lfloor N/2 \rfloor \text{ then} \\ &\quad RIV = N(L-1) + RB_{START} \\ &\text{else} \\ &\quad RIV = N(N-L+1) + (N-1-RB_{START}) \end{aligned} \quad \text{[Equation 5]}$$

A radio frame with a 10 ms length may be divided into two half frames with a 5 ms length. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
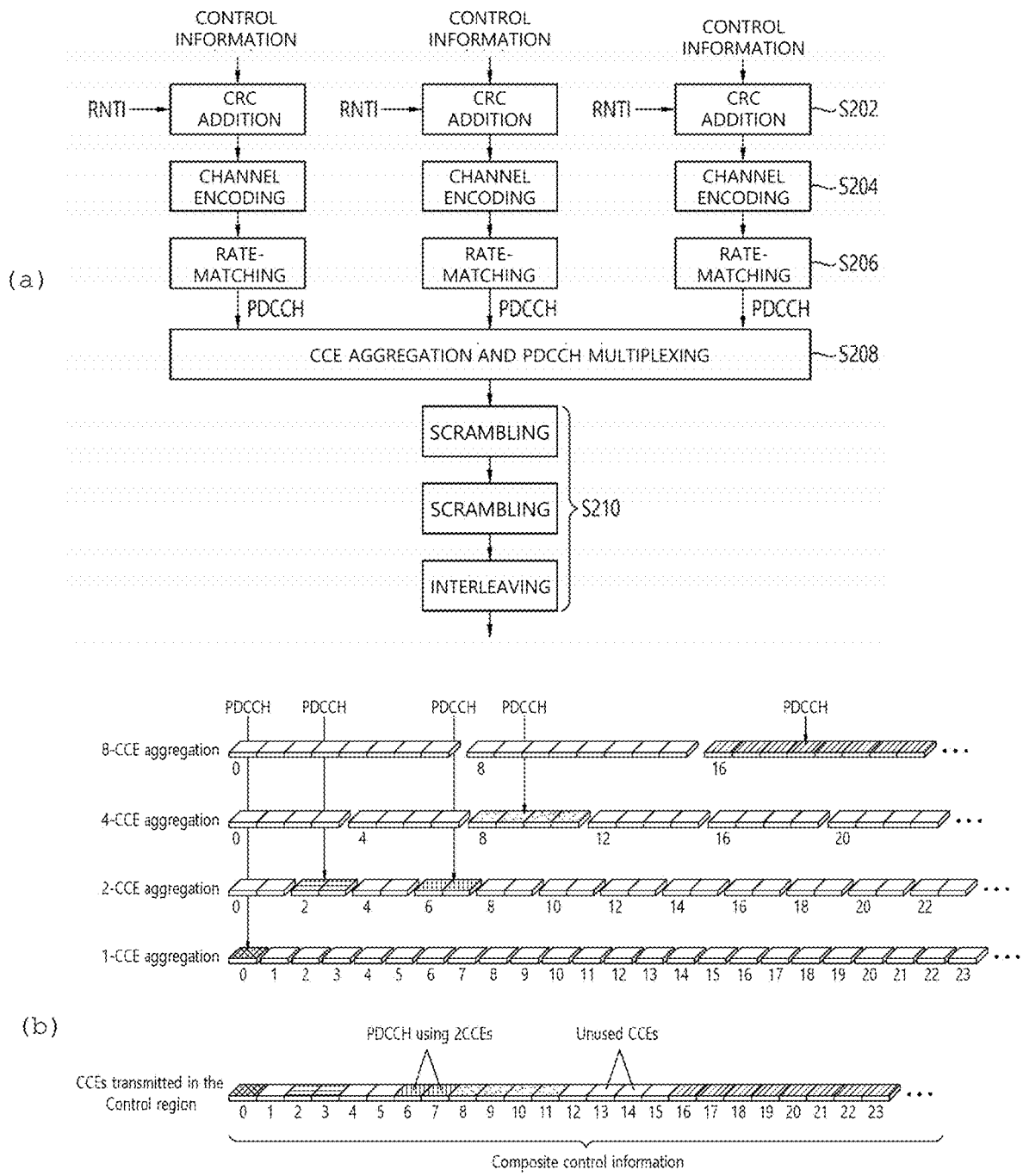
FIG. 5 illustrates a procedure for transmitting control information and a control channel in a 3GPP NR system.

FIG. 5 illustrates a procedure for transmitting control information and a control channel in a 3GPP NR system. Referring to FIG. 5(a), the base station may add a cyclic redundancy check (CRC) masked (e.g., an XOR operation) with a radio network temporary identifier (RNTI) to control information (e.g., downlink control information (DCI)) (step S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (step S206) according to the amount of resource(s) used for PDCCH transmission after performing channel encoding (e.g., polar coding) (step S204). Thereafter, the base station may multiplex the DCI(s) based on the control channel element (CCE) based PDCCH structure (step S208). In addition, the base station may apply an additional process (step S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5(b) is a diagram related to a CCE aggregation level and the multiplexing of a PDCCH and illustrates the type of a CCE aggregation level used for one PDCCH and CCE(s) transmitted in the control area according thereto.

Figure 6:
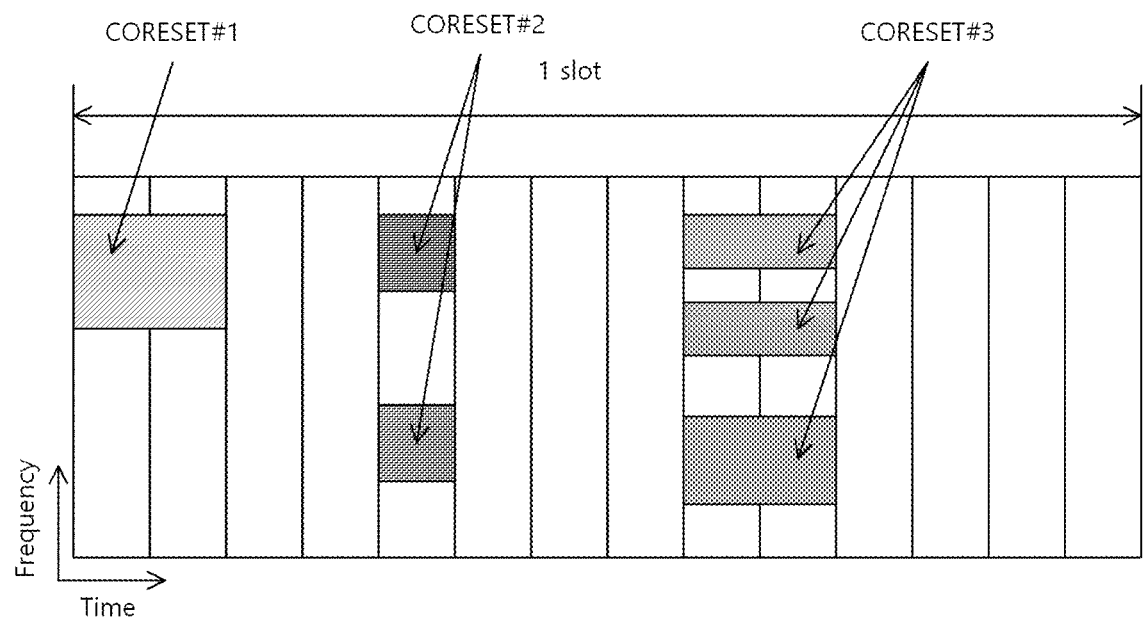
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
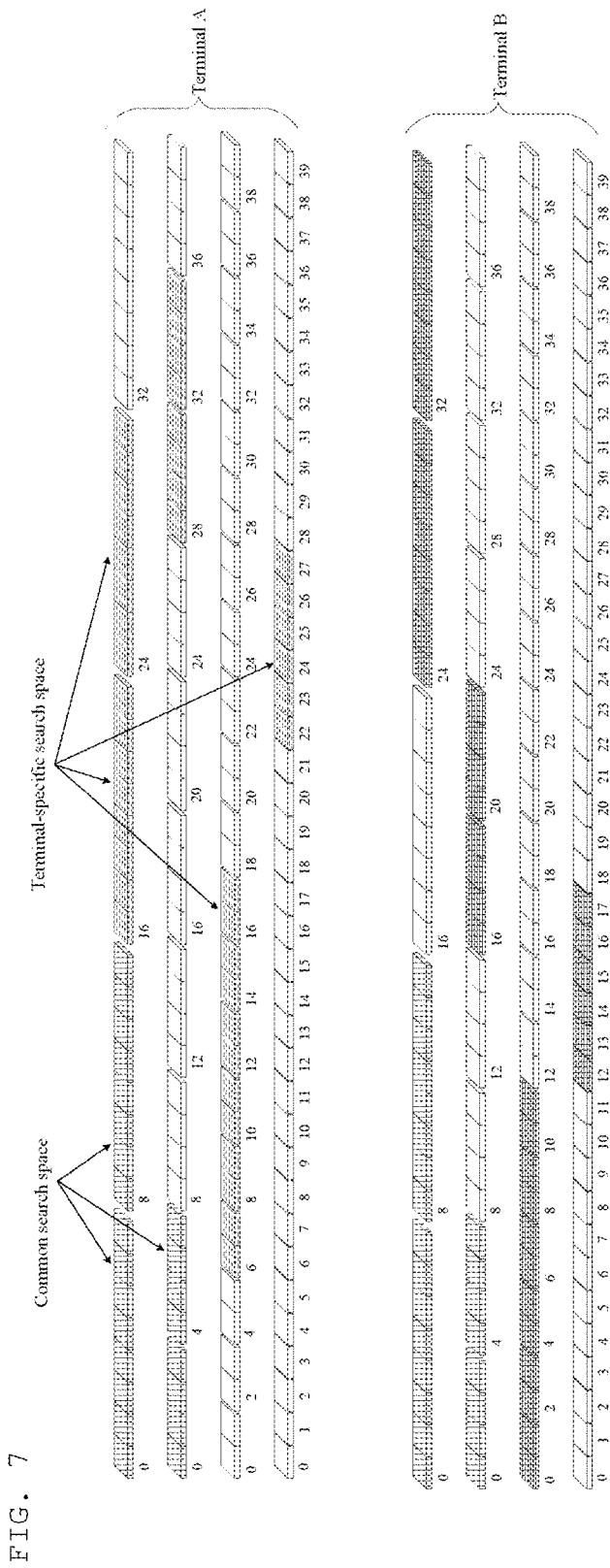
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), ..., d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
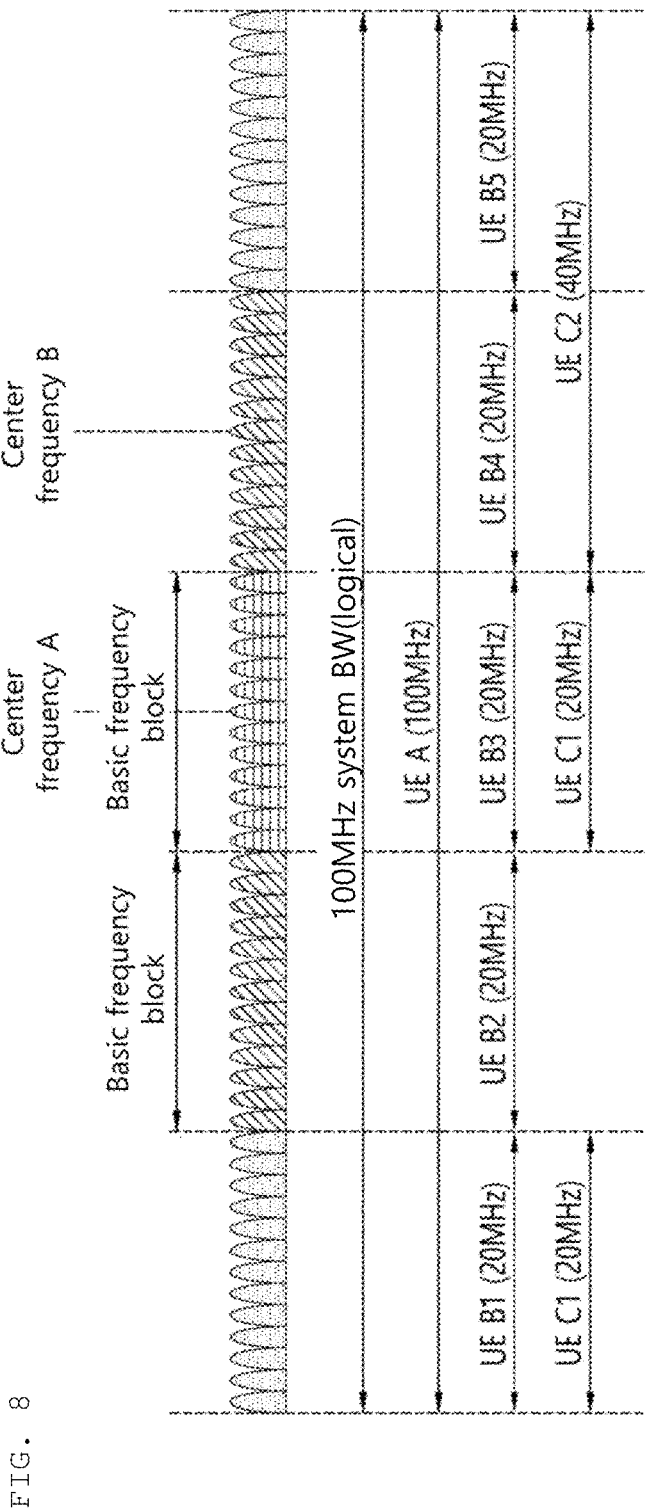
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
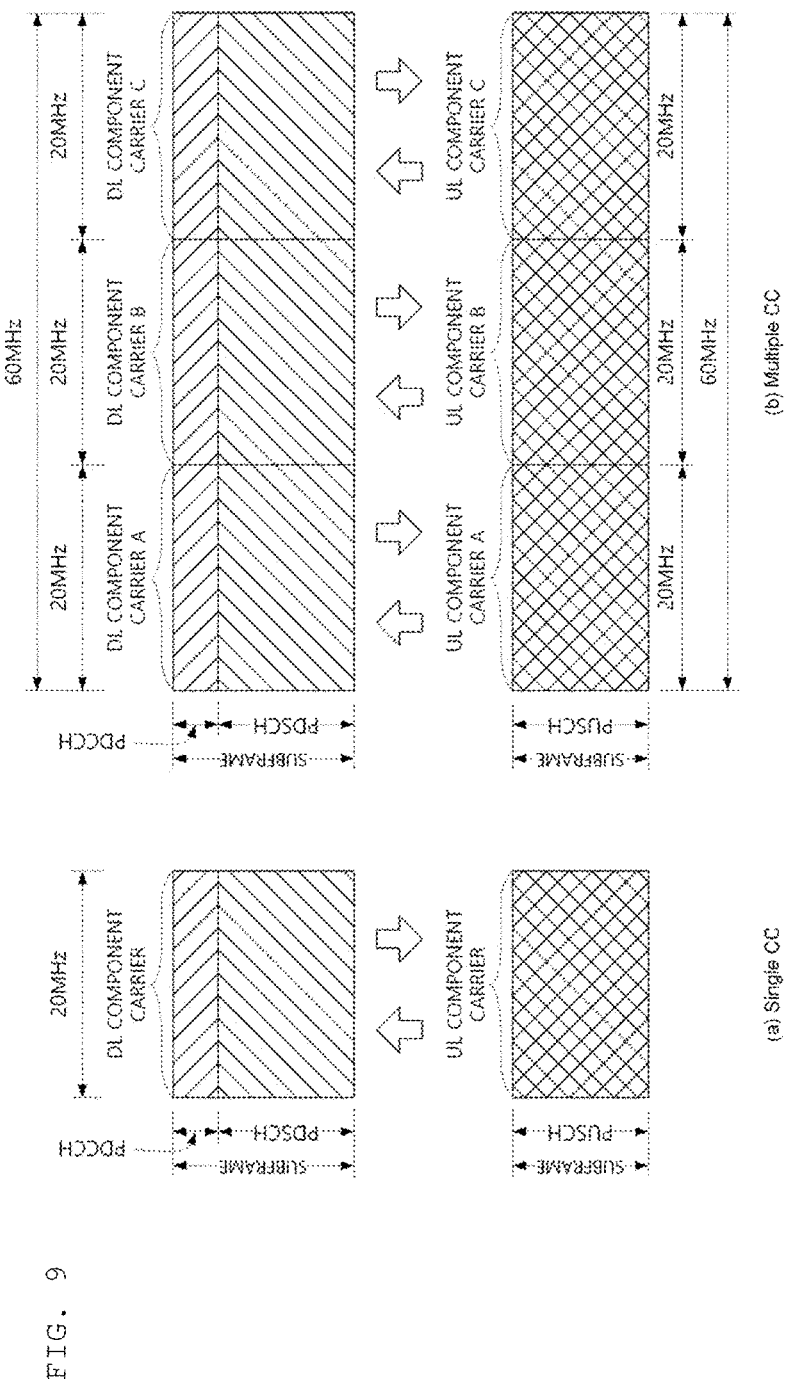
FIG. 9 is a diagram for explaining single carrier communication and multiple carrier communication.

FIG. 9 is a drawing for explaining single carrier communication and multiple carrier communication. Particularly, FIG. 9(*a*) shows a single carrier subframe structure and FIG. 9(*b*) shows a multi-carrier subframe structure.

Referring to FIG. 9(*a*), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(*b*), three 20 MHz component carriers (CCs) can be aggregated into each of UL and DL, so that a bandwidth of 60 MHz can be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
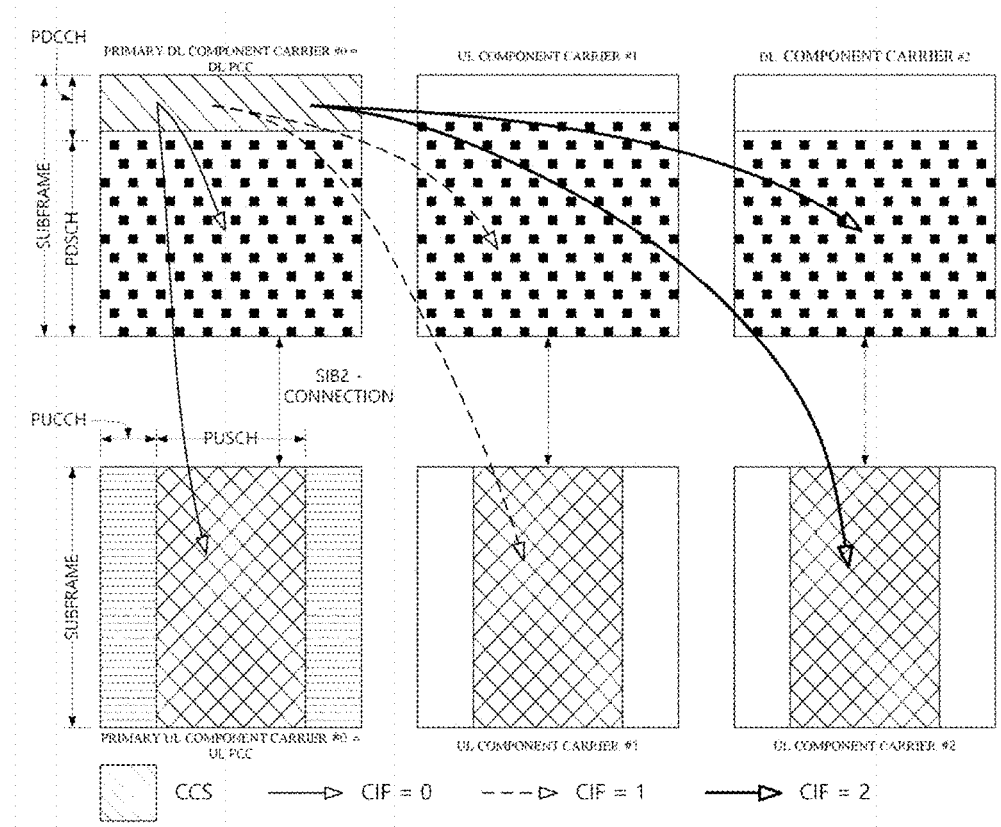
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
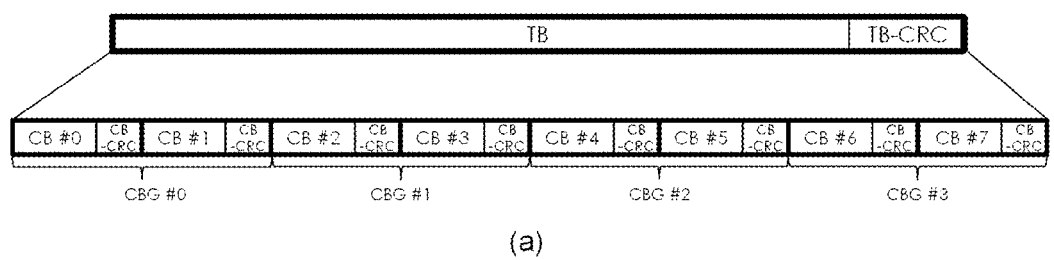
FIG. 11 illustrates a code block group (CBG) configuration and time frequency resource mapping thereof according to an embodiment of the present disclosure.
Figure 11:
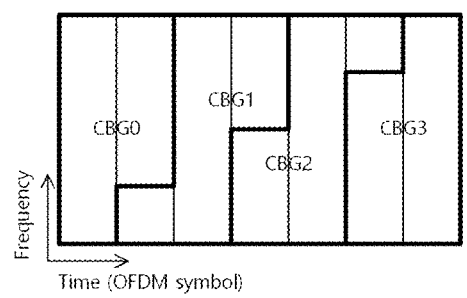

FIG. 11 illustrates a code block group (CBG) configuration and time frequency resource mapping thereof according to an embodiment of the present disclosure. More specifically, FIG. 11(a) illustrates an embodiment of a CBG configuration included in one transport block (TB), and FIG. 11(b) illustrates a time-frequency resource mapping of the CBG configuration.

A channel code defines the maximum supported length. For example, the maximum supported length of the turbo code used in 3GPP LTE (-A) is 6144 bits. However, the length of a transport block (TB) transmitted on the PDSCH may be longer than 6144 bits. If the length of the TB is longer than the maximum supported length, the TB may be divided into code blocks (CBs) having a maximum length of 6144 bits. Each CB is a unit in which channel coding is performed. Additionally, for efficient retransmission, several CBs may be grouped to configure one CBG. The UE and the base station require information on how the CBG is configured.

The CBG and the CB within the TB may be configured according to various embodiments. According to an embodiment, the number of available CBGs may be determined as a fixed value, or may be configured with RRC configuration information between the base station and the UE. In this case, the number of CBs is determined with the length of the TB, and the CBG may be configured depending on the information on the determined number. According to another embodiment, the number of CBs to be included in one CBG may be determined as a fixed value, or may be configured with RRC configuration information between the base station and the UE. In this case, if the number of CBs is determined with the length of the TB, the number of the CBGs may be configured depending on the information on the number of CBs per CBG.

Referring to the embodiment of FIG. 11(a), one TB may be divided into eight CBs. Eight CBs may be grouped into four CBGs again. The mapping relationship between the CBs and the CBGs (or CBG configuration) may be configured as static between the base station and the UE, or may be established as semi-static with RRC configuration information. According to another embodiment, the mapping relationship may be configured through dynamic signaling. When the UE receives the PDCCH transmitted by the base station, the UE may directly or indirectly identify the mapping relationship between the CB and the CBG (or CBG configuration) through explicit information and/or implicit information. One CBG may include only one CB, or may include all CBs constituting one TB. For reference, the techniques presented in the embodiments of the present disclosure may be applied regardless of the configuration of the CB and the CBG.

Referring to FIG. 11(b), CBGs constituting one TB are mapped to time-frequency resources for which the PDSCH is scheduled. According to an embodiment, each of the CBGs may be allocated first on the frequency axis and then extended on the time axis. When a PDSCH consisting of one TB including four CBGs is allocated to seven OFDM symbols, CBG0 may be transmitted over the first and second OFDM symbols, CBG1 may be transmitted over the second, third, and fourth OFDM symbols, CBG2 may be transmitted over the fourth, fifth, and sixth OFDM symbols, and CBG3 may be transmitted over the sixth and seventh OFDM symbols. The time-frequency mapping relationship allocated with the CBG and PDSCH may be determined between the base station and the UE. However, the mapping relationship illustrated in FIG. 11(b) is an embodiment for describing the present disclosure, and the techniques presented in the embodiment of the present disclosure may be applied regardless of the time-frequency mapping relationship of the CBG.

Figure 12:
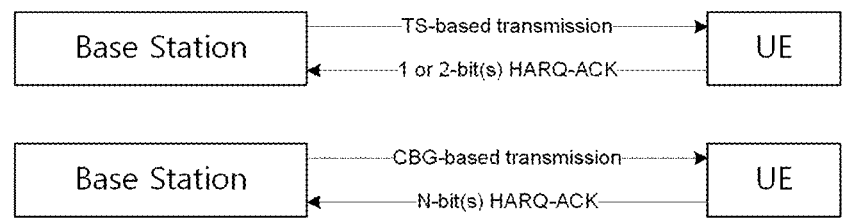
FIG. 12 illustrates a procedure in which a base station performs a TB-based transmission or a CBG-based transmission, and a UE transmits a HARQ-ACK in response thereto, according to an embodiment of the present disclosure.

FIG. 12 illustrates a procedure in which a base station performs a TB-based transmission or a CBG-based transmission, and a UE transmits a HARQ-ACK in response thereto. Referring to FIG. 12, the base station may configure a transmission scheme suitable for the UE of the TB-based transmission and the CBG-based transmission. The UE may transmit HARQ-ACK information bit(s) according to the transmission scheme configured by the base station through the PUCCH or PUSCH. The base station may configure the PDCCH to schedule the PDSCH to be transmitted to the UE. The PDCCH may schedule the TB-based transmission and/or the CBG-based transmission. For example, one TB or two TBs may be scheduled on the PDCCH. If one TB is scheduled, the UE has to feedback 1-bit HARQ-ACK. If two TBs are scheduled, a 2-bit HARQ-ACK has to be fed back for each of the two TBs. In order to eliminate ambiguity between the base station and the UE, a predetermined order may exist between each information bit of the 2-bit HARQ-ACK and two TBs. For reference, when the MIMO transmission rank or layer is low, one TB may be transmitted on one PDSCH, and when the MIMO transmission rank or layer is high, two TBs may be transmitted on one PDSCH.

The UE may transmit a 1-bit TB-based HARQ-ACK per one TB to inform the base station whether or not the reception of each TB is successful. In order to generate a HARQ-ACK for one TB, the UE may check the reception error of the TB through a TB-CRC. When the TB-CRC for the TB is successfully checked, the UE generates an ACK for the HARQ-ACK of the TB. However, if a TB-CRC error for the TB occurs, the UE generates a NACK for the HARQ-ACK of the TB. The UE transmits TB-based HARQ-ACK(s) generated as described above to the base station. The base station retransmits the TB of response with a NACK, among the TB-based HARQ-ACK(s) received from the UE.

In addition, the UE may transmit a 1-bit CBG-based HARQ-ACK per one CBG to inform the base station whether or not the reception of each CBG is successful. In order to generate a HARQ-ACK for one CBG, the UE may decode all CBs included in the CBG and check the reception error of each CB through the CB-CRC. When the UE successfully receives all CBs constituting one CBG (that is, when all CB-CRCs are successfully checked), the UE generates an ACK for the HARQ-ACK of the CBG. However, when the UE does not successfully receive at least one of the CBs constituting one CBG (that is, when at least one CB-CRC error occurs), the UE generates a NACK for the HARQ-ACK of the CBG. The UE transmits the CBG-based HARQ-ACK(s) generated as described above to the base station. The base station retransmits the CBG of response with a NACK, among the CBG-based HARQ-ACK(s) received from the UB. According to an embodiment, the CB configuration of the retransmitted CBG may be the same as the CB configuration of the previously transmitted CBG. The length of the CBG-based HARQ-ACK information bit(s) transmitted by the UE to the base station may be determined based on the number of CBGs transmitted through the PDSCH or the maximum number of CBGs configured with RRC signals.

On the other hand, even when the UE successfully receives all the CBGs included in the TB, a TB-CRC error for the TB may occur. In this case, the UE may perform flipping of the CBG-based HARQ-ACK in order to request retransmission for the TB. That is, even though all CBGs included in the TB are successfully received, the UE may generate all of the CBG-based HARQ-ACK information bits as NACKs. Upon receiving the CBG-based HARQ-ACK feedback in which all HARQ-ACK information bits are NACKs, the base station retransmits all CBGs of the TB.

According to an embodiment of the present disclosure, CBG-based HARQ-ACK feedback may be used for the successful transmission of the TB. The base station may indicate the UE to transmit a CBG-based HARQ-ACK. In this case, a retransmission technique according to the CBG-based HARQ-ACK may be used. The CBG-based HARQ-ACK may be transmitted through a PUCCH. In addition, when the UCI is configured to be transmitted through the PUSCH, the CBG-based HARQ-ACK may be transmitted through the PUSCH. In the PUCCH, the configuration of the HARQ-ACK resource may be configured through an RRC signal. In addition, an actually transmitted HARQ-ACK resource may be indicated through a PDCCH scheduling a PDSCH transmitted based on the CBG. The UE may transmit HARQ-ACK(s) for whether or not the reception of transmitted CBGs is transmitted, through one PUCCH resource indicated through the PDCCH among PUCCH resources configured with RRC.

The base station may identify whether the UE has successfully received the CBG(s) transmitted to the UE through CBG-based HARQ-ACK feedback of the UE. That is, through the HARQ-ACK for each CBG received from the UE, the base station may recognize the CBG(s) that the UE has successfully received and the CBG(s) that the UE has failed to receive. The base station may perform CBG retransmission based on the received CBG-based HARQ-ACK. More specifically, the base station may bundle and retransmit only the CBG(s) of HARQ-ACKs of response with failure, in one TB. In this case, the CBG(s) for which the HARQ-ACKs is responded with successful reception are excluded from retransmission. The base station may schedule the retransmitted CBG(s) as one PDSCH and transmit it to the UE.

<Communication Method in Unlicensed Band>

Figure 13:
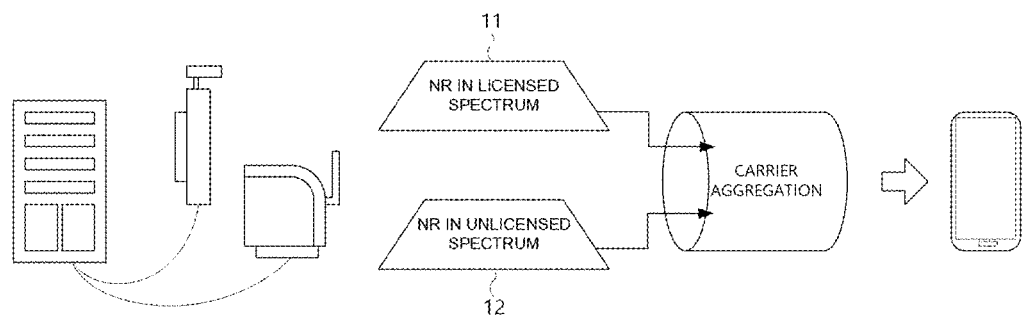
FIG. 13 illustrates a New Radio-Unlicensed (NR-U) service environment.

FIG. 13 illustrates a New Radio-Unlicensed (NR-U) service environment.

Referring to FIG. 13, a service environment in which NR technology 11 in the existing licensed band and NR-Unlicensed (NR-U), i.e., NR technology 12 in the unlicensed band may be provide to the user. For example, in the NR-U environment, NR technology 11 in the licensed band and the NR technology 12 in the unlicensed band may be integrated using technologies such as carrier aggregation which may contribute to network capacity expansion. In addition, in an asymmetric traffic structure with more downlink data than uplink data, NR-U can provide an NR service optimized for various needs or environments. For convenience, the NR technology in the licensed band is referred to as NR-L (NR-Licensed), and the NR technology in the unlicensed band is referred to as NR-U (NR-Unlicensed).

Figure 14:
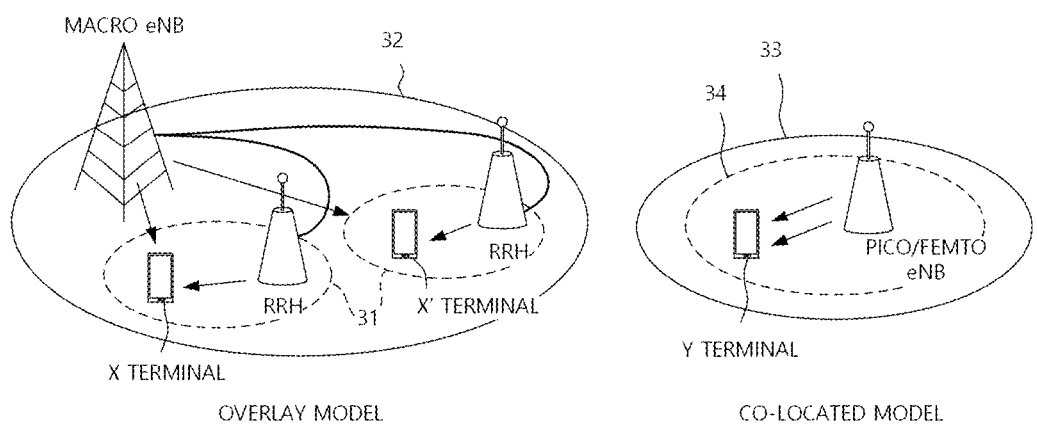
FIG. 14 illustrates an embodiment of an arrangement scenario of a UE and a base station in an NR-U service environment.

FIG. 14 illustrates a deployment scenario of a user equipment and a base station in an NR-U service environment. A frequency band targeted by the NR-U service environment has short radio communication range due to the high frequency characteristics. Considering this, the deployment scenario of the user equipment and the base station may be an overlay model or a co-located model in an environment in which coexist the existing NR-L service and NR-U service.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the NR-U service as an auxiliary downlink channel of the NR-L service through the carrier aggregation.

In the co-located model, a pico/femto base station may perform the wireless communication with a Y UE by using both the licensed carrier and the unlicensed carrier. However, it may be limited that the pico/femto base station uses both the NR-L service and the NR-U service to downlink transmission. A coverage (33) of the NR-L service and a coverage (34) of the NR-U service may be different according to the frequency band, transmission power, and the like.

When NR communication is performed in the unlicensed band, conventional equipments (e.g., wireless LAN (Wi-Fi) equipments) which perform communication in the corresponding unlicensed band may not demodulate an NR-U message or data. Therefore, conventional equipments determine the NR-U message or data as a kind of energy to perform an interference avoidance operation by an energy detection technique. That is, when energy corresponding to the NR-U message or data is lower than −62 dBm or certain energy detection (ED) threshold value, the wireless LAN equipments may perform communication by disregarding the corresponding message or data. As a result, that user equipment which performs the NR communication in the unlicensed band may be frequently interfered by the wireless LAN equipments.

Therefore, a specific frequency band needs to be allocated or reserved for a specific time in order to effectively implement an NR-U technology/service. However, since peripheral equipments which perform communication through the unlicensed band attempt access based on the energy detection technique, there is a problem in that an efficient NR-U service is difficult. Therefore, a research into a coexistence scheme with the conventional unlicensed band device and a scheme for efficiently sharing a radio channel needs to be preferentially made in order to settle the NR-U technology. That is, a robust coexistence mechanism in which the NR-U device does not influence the conventional unlicensed band device needs to be developed.

Figure 15:
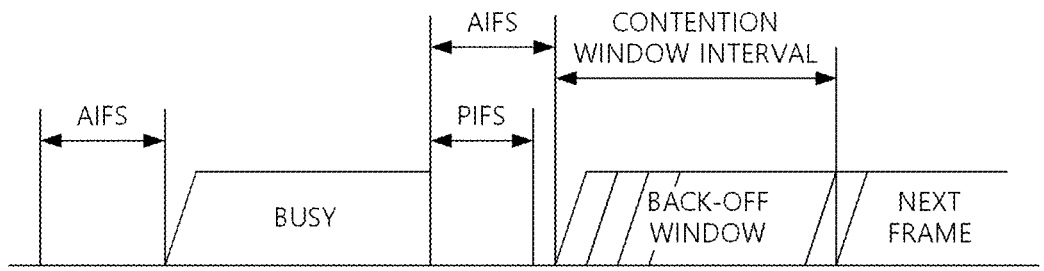
FIG. 15 illustrates a communication method (e.g., wireless LAN) operating in an existing unlicensed band.

FIG. 15 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 15, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (P IFS), or the like). The defer duration represents a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since the existing communication in the unlicensed band mostly operates based on LBT, a channel access in the NR-U system also performs LBT for coexistence with existing devices. Specifically, the channel access method on the unlicensed band in the NR may be classified into the following four categories according to the presence/absence of LBT/application method.

Category 1: No LBT

The Tx entity does not perform the LBT procedure for transmission.

Category 2: LBT without Random Backoff

The Tx entity senses whether a channel is idle during a first interval without random backoff to perform a transmission. That is, the Tx entity may perform a transmission through the channel immediately after the channel is sensed to be idle during the first interval. The first interval is an interval of a predetermined length immediately before the Tx entity performs the transmission. According to an embodiment, the first interval may be an interval of 25 μs length, but the present disclosure is not limited thereto.

Category 3: LBT Performing Random Backoff Using CW of Fixed Size

The Tx entity obtains a random value within the CW of the fixed size, sets it to an initial value of a backoff counter (or backoff timer) N, and performs backoff by using the set backoff counter N. That is, in the backoff procedure, the Tx entity decreases the backoff counter by 1 whenever the channel is sensed to be idle for a predetermined slot period. Here, the predetermined slot period may be 9 μs, but the present disclosure is not limited thereto. The backoff counter N is decreased by 1 from the initial value, and when the value of the backoff counter N reaches 0, the Tx entity may perform the transmission. Meanwhile, in order to perform backoff, the Tx entity first senses whether the channel is idle during a second interval (that is, a defer duration $T_d$). According to an embodiment of the present disclosure, the Tx entity may sense (determine) whether the channel is idle during the second interval, according to whether the channel is idle for at least some period (e.g., one slot period) within the second interval. The second interval may be set based on the channel access priority class of the Tx entity, and consists of a period of 16 μs and m consecutive slot periods. Here, m is a value set according to the channel access priority class. The Tx entity performs channel sensing to decrease the backoff counter when the channel is sensed to be idle during the second interval. On the other hand, when the channel is sensed to be busy during the backoff procedure, the backoff procedure is stopped. After stopping the backoff procedure, the Tx entity may resume backoff when the channel is sensed to be idle for an additional second interval. In this way, the Tx entity may perform the transmission when the channel is idle during the slot period of the backoff counter N, in addition to the second interval. In this case, the initial value of the backoff counter N is obtained within the CW of the fixed size.

Category 4: LBT Performing Random Backoff by Using CW of Variable Size

The Tx entity obtains a random value within the CW of a variable size, sets the random value to an initial value of a backoff counter (or backoff timer) N, and performs backoff by using the set backoff counter N. More specifically, the Tx entity may adjust the size of the CW based on HARQ-ACK information for the previous transmission, and the initial value of the backoff counter N is obtained within the CW of the adjusted size. A specific process of performing backoff by the Tx entity is as described in Category 3. The Tx entity may perform the transmission when the channel is idle during the slot period of the backoff counter N, in addition to the second interval. In this case, the initial value of the backoff counter N is obtained within the CW of the variable size.

In the above Category 1 to Category 4, the Tx entity may be a base station or a UE. According to an embodiment of the present disclosure, a first type channel access may refer to a Category 4 channel access, and a second type channel access may refer to a Category 2 channel access.

Figure 16:
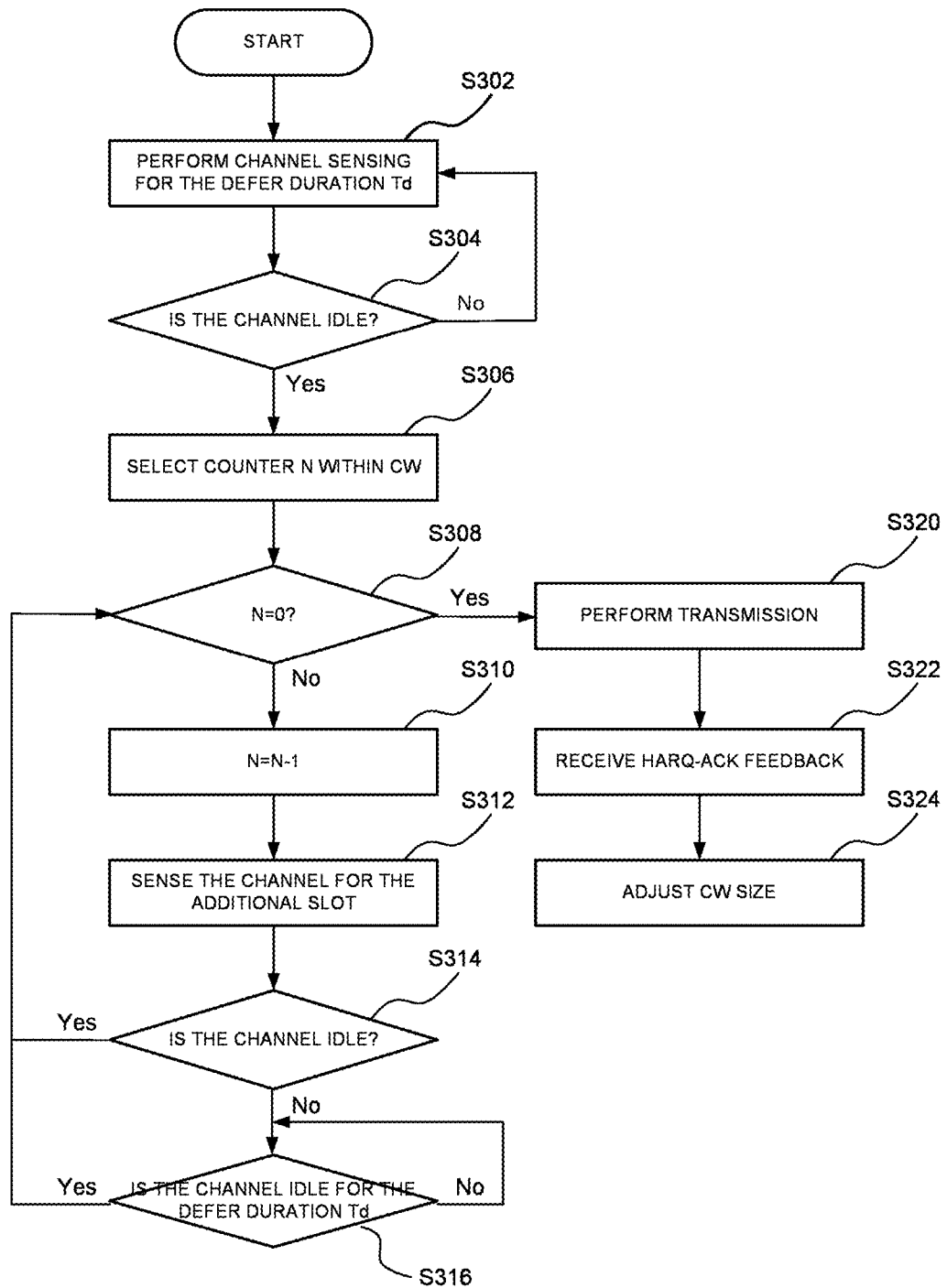
FIG. 16 illustrates a channel access procedure based on Category 4 LBT according to an embodiment of the present disclosure.

FIG. 16 illustrates a channel access procedure based on Category 4 LBT according to an embodiment of the present disclosure.

In order to perform the channel access, first, the Tx entity performs channel sensing for the defer duration $T_d$ (step S302). According to an embodiment of the present disclosure, the channel sensing for a defer duration $T_d$ in step S302 may be performed through channel sensing for at least a portion of the defer duration $T_d$. For example, the channel sensing for the defer duration $T_d$ may be performed through the channel sensing during one slot period within the defer duration $T_d$. The Tx entity checks whether the channel is idle through the channel sensing for the defer duration $T_d$ (step S304). If the channel is sensed to be idle for the defer duration $T_d$, the Tx entity proceeds to step S306. If the channel is not sensed to be idle for the defer duration $T_d$ (that is, sensed to be busy), the Tx entity returns to step S302. The Tx entity repeats steps S302 to S304 until the channel is sensed to be idle for the defer duration $T_d$. The defer duration $T_d$ may be set based on the channel access priority class of the Tx entity, and consists of a period of 16 μs and m consecutive slot periods. Here, m is a value set according to the channel access priority class.

Next, the Tx entity obtains a random value within a predetermined CW, sets the random value to the initial value of the backoff counter (or backoff timer) N (step S306), and proceeds to step S308. The initial value of the backoff counter N is randomly selected from values between 0 and CW. The Tx entity performs the backoff procedure by using the set backoff counter N. That is, the Tx entity performs the backoff procedure by repeating steps S308 to S316 until the value of the backoff counter N reaches 0. Meanwhile, FIG. 16 illustrates that step S306 is performed after the channel is sensed to be idle for the defer duration $T_d$, but the present disclosure is not limited thereto. That is, step S306 may be performed independently of steps S302 to S304, and may be performed prior to steps S302 to S304. When step S306 is performed prior to steps S302 to S304, if the channel is sensed to be idle for the defer duration $T_d$ by steps S302 to S304, the Tx entity proceeds to step S308.

In step S308, the Tx entity checks whether the value of the backoff counter N is 0. If the value of the backoff counter N is 0, the Tx entity proceeds to step S320 to perform a transmission. If the value of the backoff counter N is not 0, the Tx entity proceeds to step S310. In step S310, the Tx entity decreases the value of the backoff counter N by 1. According to an embodiment, the Tx entity may selectively decrease the value of the backoff counter by 1 in the channel sensing process for each slot. In this case, step S310 may be skipped at least once by the selection of the Tx entity. Next, the Tx entity performs channel sensing for an additional slot period (step S312). The Tx entity checks whether the channel is idle through the channel sensing for the additional slot period (step S314). If the channel is sensed to be idle for the additional slot period, the Tx entity returns to step S308. In this way, the Tx entity may decrease the backoff counter by 1 whenever the channel is sensed to be idle for a predetermined slot period. Here, the predetermined slot period may be 9 μs, but the present disclosure is not limited thereto.

In step S314, if the channel is not sensed to be idle for the additional slot period (that is, sensed to be busy), the Tx entity proceeds to step S316. In step S316, the Tx entity checks whether the channel is idle for the additional defer duration $T_d$. According to an embodiment of the present disclosure, the channel sensing in step S316 may be performed in units of slots. That is, the Tx entity checks whether the channel is sensed to be idle during all slot periods of the additional defer duration $T_d$. When the busy slot is detected within the additional defer duration $T_d$, the Tx entity immediately restarts step S316. When the channel is sensed to be idle during all slot periods of the additional defer duration $T_d$, the Tx entity returns to step S308.

On the other hand, if the value of the backoff counter N is 0 in the check of step S308, the Tx entity performs the transmission (step S320). The Tx entity receives a HARQ-ACK feedback corresponding to the transmission (step S322). The Tx entity may check whether the previous transmission is successful through the received HARQ-ACK feedback. Next, the Tx entity adjusts the CW size for the next transmission based on the received HARQ-ACK feedback (step S324).

As described above, after the channel is sensed to be idle for the defer duration $T_d$, the Tx entity may perform the transmission when the channel is idle for N additional slot periods. As described above, the Tx entity may be a base station or a UE, and the channel access procedure of FIG. 16 may be used for downlink transmission of the base station and/or uplink transmission of the UE.

Hereinafter, a method for adaptively adjusting a CWS when accessing a channel in an unlicensed band is presented. The CWS may be adjusted based on UE (User Equipment) feedback, and UE feedback used for CWS adjustment may include the HARQ-ACK feedback and CQI/PMI/RI. In the present disclosure, a method for adaptively adjusting a CWS based on the HARQ-ACK feedback is presented. The HARQ-ACK feedback includes at least one of ACK, NACK, DTX, and NACK/DTX.

As described above, the CWS is adjusted based on ACK even in a wireless LAN system. When the ACK feedback is received, the CWS is reset to the minimum value (CWmin), and when the ACK feedback is not received, the CWS is increased. However, in a cellular system, a CWS adjustment method in consideration of multiple access is required.

First, for the description of the present disclosure, terms are defined as follows.

Set of HARQ-ACK feedback values (i.e., HARQ-ACK feedback set): refers to HARQ-ACK feedback value(s) used for CWS update/adjustment. The HARQ-ACK feedback set is decoded at a time when the CWS is determined and corresponds to available HARQ-ACK feedback values. The HARQ-ACK feedback set includes HARQ-ACK feedback value(s) for one or more DL (channel) transmissions (e.g., PDSCH) on an unlicensed band carrier (e.g., Scell, NR-U cell). The HARQ-ACK feedback set may include HARQ-ACK feedback value(s) for a DL (channel) transmission (e.g., PDSCH), for example, a plurality of HARQ-ACK feedback values fed back from a plurality of UEs. The HARQ-ACK feedback value may indicate reception response information for the code block group (CBG) or the transport block (TB), and may indicate any one of ACK, NACK, DTX, or NACK/DTX. Depending on the context, the HARQ-ACK feedback value may be mixed with terms such as a HARQ-ACK value, a HARQ-ACK information bit, and a HARQ-ACK response.

Reference window: refers to a time interval in which a DL transmission (e.g., PDSCH) corresponding to the HARQ-ACK feedback set is performed in an unlicensed band carrier (e.g., Scell, NR-U cell). A reference window may be defined in units of slots or subframes according to embodiments. The reference window may indicate one or more specific slots (or subframes). According to an embodiment of the present disclosure, the specific slot (or reference slot) may include a start slot of the most recent DL transmission burst in which at least some HARQ-ACK feedback is expected to be available.

Figure 17:
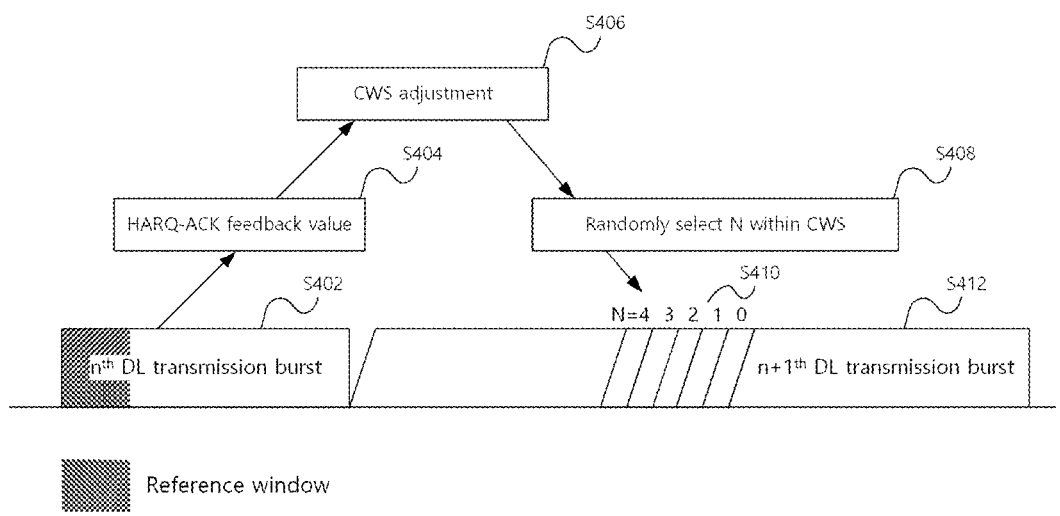
FIG. 17 illustrates an embodiment of a method of adjusting a contention window size (CWS) based on HARQ-ACK feedback.

FIG. 17 illustrates an embodiment of a method of adjusting a contention window size (CWS) based on HARQ-ACK feedback. In the embodiment of FIG. 17, the Tx entity may be a base station and the Rx entity may be a UE, but the present disclosure is not limited thereto. In addition, although the embodiment of FIG. 17 assumes a channel access procedure for the DL transmission by the base station, at least some configurations may be applied to a channel access procedure for the UL transmission by the UE.

Referring to FIG. 17, the Tx entity transmits the n-th DL transmission burst on an unlicensed band carrier (e.g., Scell, NR-U cell) (step S402), and then if an additional DL transmission is required, the Tx entity may transmit the (n+1)-th DL transmission burst based on the LBT channel access (step S412). Here, the transmission burst indicates a transmission through one or more adjacent slots (or subframes). FIG. 17 illustrates a channel access procedure and a CWS adjustment method based on the aforementioned first type channel access (that is, Category 4 channel access).

First, the Tx entity receives a HARQ-ACK feedback corresponding to the PDSCH transmission(s) on an unlicensed band carrier (e.g., Scell, NR-U cell) (step S404). The HARQ-ACK feedback used for CWS adjustment includes a HARQ-ACK feedback corresponding to the most recent DL transmission burst (that is, n-th DL transmission burst) on the unlicensed band carrier. More specifically, the HARQ-ACK feedback used for CWS adjustment includes a HARQ-ACK feedback corresponding to the PDSCH transmission on the reference window within the most recent DL transmission burst. The reference window may indicate one or more specific slots (or subframes). According to an embodiment of the present disclosure, the specific slot (or reference slot) includes a start slot of the most recent DL transmission burst in which at least some HARQ-ACK feedback is expected to be available.

When the HARQ-ACK feedback is received, a HARQ-ACK value is obtained for each transport block (TB). The HARQ-ACK feedback includes at least one of a TB-based HARQ-ACK bit sequence and a CBG-based HARQ-ACK. When the HARQ-ACK feedback is the TB-based HARQ-ACK bit sequence, one HARQ-ACK information bit is obtained per TB. On the other hand, when the HARQ-ACK feedback is the CBG-based HARQ-ACK bit sequence, N HARQ-ACK information bit(s) are obtained per TB. Here, N is the maximum number of CBGs per TB configured in the Rx entity of the PDSCH transmission. According to an embodiment of the present disclosure, HARQ-ACK value(s) for each TB may be determined with the HARQ-ACK information bit(s) for each TB of the HARQ-ACK feedback for CWS determination. More specifically, when the HARQ-ACK feedback is the TB-based HARQ-ACK bit sequence, one HARQ-ACK information bit of the TB is determined as the HARQ-ACK value. However, when the HARQ-ACK feedback is the CBG-based HARQ-ACK bit sequence, one HARQ-ACK value may be determined based on N HARQ-ACK information bit(s) corresponding to CBGs included in the TB.

Next, the Tx entity adjusts the CWS based on the HARQ-ACK values determined in step S404 (step S406). That is, the Tx entity determines the CWS based on the HARQ-ACK value(s) determined with the HARQ-ACK information bit(s) for each TB of the HARQ-ACK feedback. More specifically, the CWS may be adjusted based on the ratio of NACKs among HARQ-ACK value(s). First, variables may be defined as follows.

p: Priority class value
CW_min_p: Predetermined CWS minimum value of priority class p
CW_max_p: Predetermined CWS maximum value of priority class p
CW_p: CWS for transmission of priority class p. CW_p is set to any one of a plurality of CWS values between CW_min_p and CW_max_p included in the allowed CWS set of the priority class p.

According to an embodiment of the present disclosure, the CWS may be determined according to the following steps.

Step A-1) For every priority class p, CW_p is set to CW_min_p. In this case, the priority class p includes {1, 2, 3, 4}.

Step A-2) When the ratio of NACKs to HARQ-ACK values for the PDSCH transmission(s) of the reference window k is Z % or more, CW_p is increased to the next highest allowed value for every priority class p (further, Step A-2 remains). Otherwise, Step A proceeds to Step A-1. Here, Z is a predetermined integer in the range of 0<=Z<=100, and according to an embodiment, it may be set to one of {30, 50, 70, 80, 100}.

Here, the reference window k includes the start slot (or subframe) of the most recent transmission by the Tx entity. In addition, the reference window k is a slot (or subframe) in which at least some of the HARQ-ACK feedbacks is expected to be possible. If CW_p=CW_max_p, the next highest allowed value for CW_p adjustment is CW_max_p.

Next, the Tx entity selects a random value within the CWS determined in step S406 and sets the random value to the initial value of the backoff counter N (step S408). The Tx entity performs backoff by using the set backoff counter N (step S410). That is, the Tx entity may decrease the backoff counter by 1 for each slot period in which the channel is sensed to be idle. When the value of the backoff counter reaches 0, the Tx entity may transmit the (n+1)-th DL transmission burst in the channel (step S412).

Meanwhile, in the above-described CWS adjustment process, determination has to be made as to whether not only ACK and NACK but also DTX or NACK/DTX are considered together among HARQ-ACK feedbacks. According to an embodiment of the present disclosure, depending on whether the transmission in the unlicensed band is based on self-carrier scheduling or cross-carrier scheduling, determination may be made as to whether DTX or NACK/DTX is considered together in the CWS adjustment process.

In self-carrier scheduling, a DL transmission (e.g., PDSCH) on the unlicensed band carrier is scheduled through the control channel (e.g., (E)PDCCH) transmitted on the same unlicensed band carrier. Here, since the DTX indicates a failure of the DL transmission by a hidden node or the like in the unlicensed band carrier, it may be used for CWS adjustment together with NACK. In addition, DTX is one of the methods in which the UE informs the base station that the UE fails to decode the control channel even though the base station transmits, to the UE, the control channel including scheduling information (e.g., (E)PDCCH). DTX may be determined only by the HARQ-ACK feedback value, or may be determined taking into account the HARQ-ACK feedback value and the actual scheduling situation. According to an embodiment of the present disclosure, DTX and NACK/DTX may be counted as NACK for CWS adjustment in the self-carrier scheduling situation. That is, when the ratio of the sum of NACK, DTX, and NACK/DTX to HARQ-ACK values for the PDSCH transmission(s) of the reference window k is equal to or greater than Z %, the CWS is increased to the next highest allowed value. Otherwise, the CWS is reset to the minimum value.

In cross-carrier scheduling, a DL transmission (e.g., PDSCH) on the unlicensed band carrier may be scheduled through the control channel (e.g., (E)PDCCH) transmitted on the licensed band carrier. In this case, since the DTX feedback is used to determine the decoding situation of the UE for the control channel transmitted on the licensed band carrier, it is not helpful to adaptively adjust the CWS for a channel access in the unlicensed band. Therefore, according to an embodiment of the present disclosure, DTX may be ignored for CWS determination in the cross-carrier scheduling situation from the licensed band. That is, for CWS adjustment, among HARQ-ACK value(s), only ACK and NACK may be considered for calculating the ratio of NACK, or only ACK, NACK and NACK/DTX may be considered for calculating the ratio of NACK. Therefore, when calculating the ratio of the NACK, DTX may be excluded.

Figure 18:
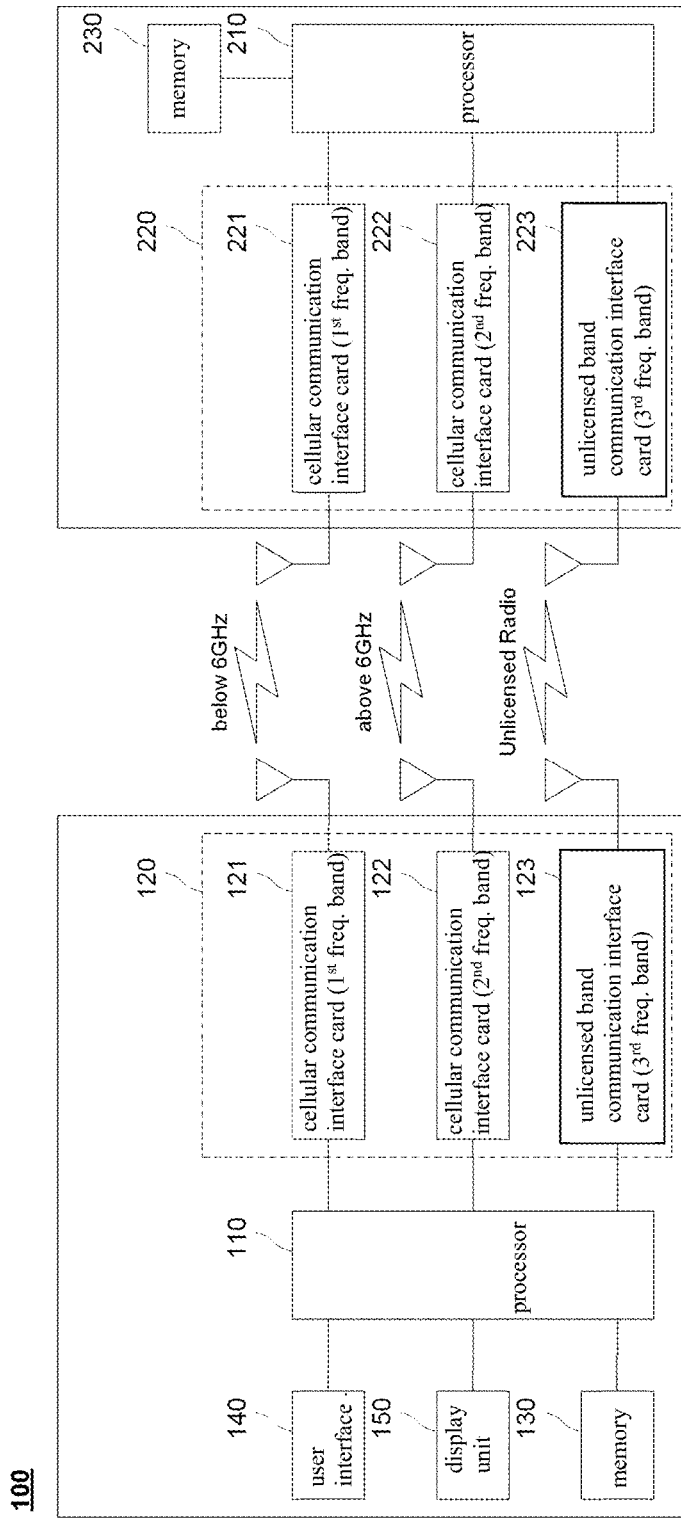
FIG. 18 is a block diagram illustrating configurations of a UE and a base station according to an embodiment of the present disclosure.

FIG. 18 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 100 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the UE 100, an external device, and a server in accordance with the cellular communication standards or protocols in the frequency bands 6 GHz or more supported by the corresponding NIC module.

The unlicensed band communication interface card 223 transmits or receives a radio signal with at least one of the UE 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 18 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Figure 19:
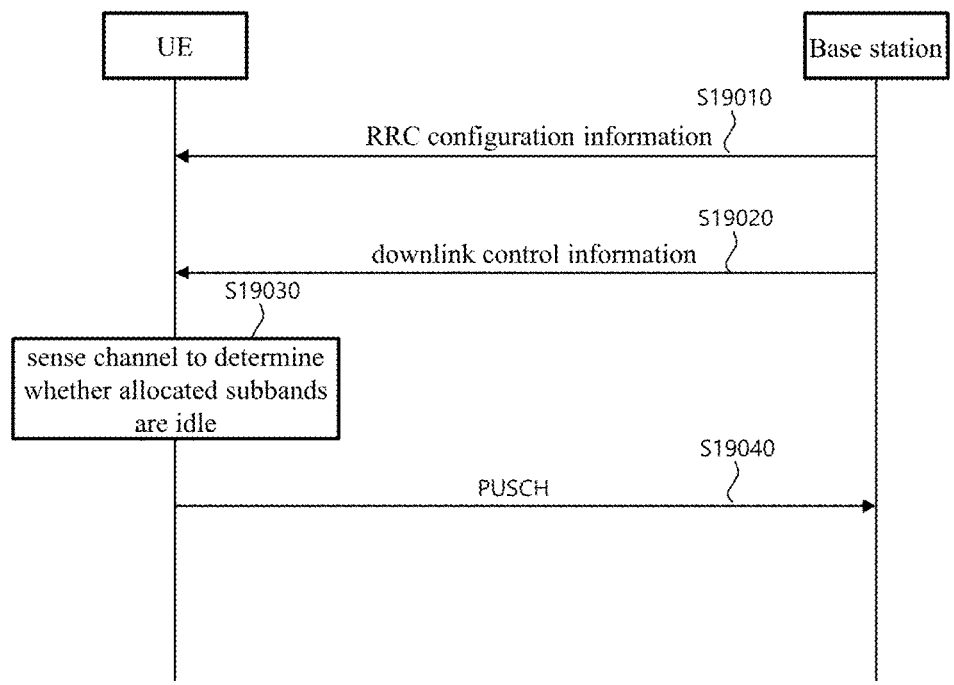
FIG. 19 is a flowchart illustrating an example of a method of transmitting uplink data in an unlicensed band according to an embodiment of the present disclosure.

FIG. 19 is a flowchart illustrating an example of a method of transmitting uplink data in an unlicensed band according to an embodiment of the present disclosure.

Referring to FIG. 19, the UE performs channel sensing in a BWP activated to transmit a Physical uplink Shared Channel (PUSCH) in an unlicensed band and, when the sensed channel is in an idle state, transmits the PUSCH to the base station in the channel in the idle state.

Specifically, the UE receives an RRC configuration (Radio Resource Control Configuration) including information for receiving downlink control information and information for PUSCH transmission from the base station in S19010.

The UE may receive Downlink Control Information (DCI) on the basis of the information included in the received RRC configuration in S19020.

The DCI may include resource allocation information related to resources allocated for PUSCH transmission, configuration information related to a reference signal, and the like.

When there are a plurality of BWPs, the DCI may further include an indicator indicating a BWP activated to transmit the PUSCH by the UE and information related to a subband in which an LBT operation for performing the channel sensing described with reference to FIG. 15 when uplink data is transmitted in the unlicensed band.

At this time, subbands may be continuously allocated, and information related to the continuously allocated subbands may be included in the DCI through a RIV (Resource Information Value) scheme.

Further, PRBs that are Resource Blocks (RBs) included in the activated BWP may be included in the BWP in an interlace structure in which mapping is performed at predetermined intervals, and resource allocation information related to PRBs that are allocated resources may be included in the DCI through the RIV or a bitmap scheme.

The RIV scheme refers to a method by which a start index of the allocated resources and length information of the allocated resources are inserted into the DCI and informed to the UE, and thus the UE recognizes the allocated resources, and the bitmap scheme refers to a method of indicating a detailed location of the allocated resources through bits.

The method of inserting the information related to the subbands and the allocated resources into the DCI is described in detail with reference to FIGS. 20 to 22 below.

Thereafter, the UE performs a channel sensing operation and determines whether the allocated subbands are idle in S19030. If the allocated subbands are not idle, the subbands may be sensed again through the method described with reference to FIG. 15. However, if the allocated subbands are idle, the UE may transmit the PUSCH to the base station through the PRBs included in the allocated subbands in S19040.

Figure 20:
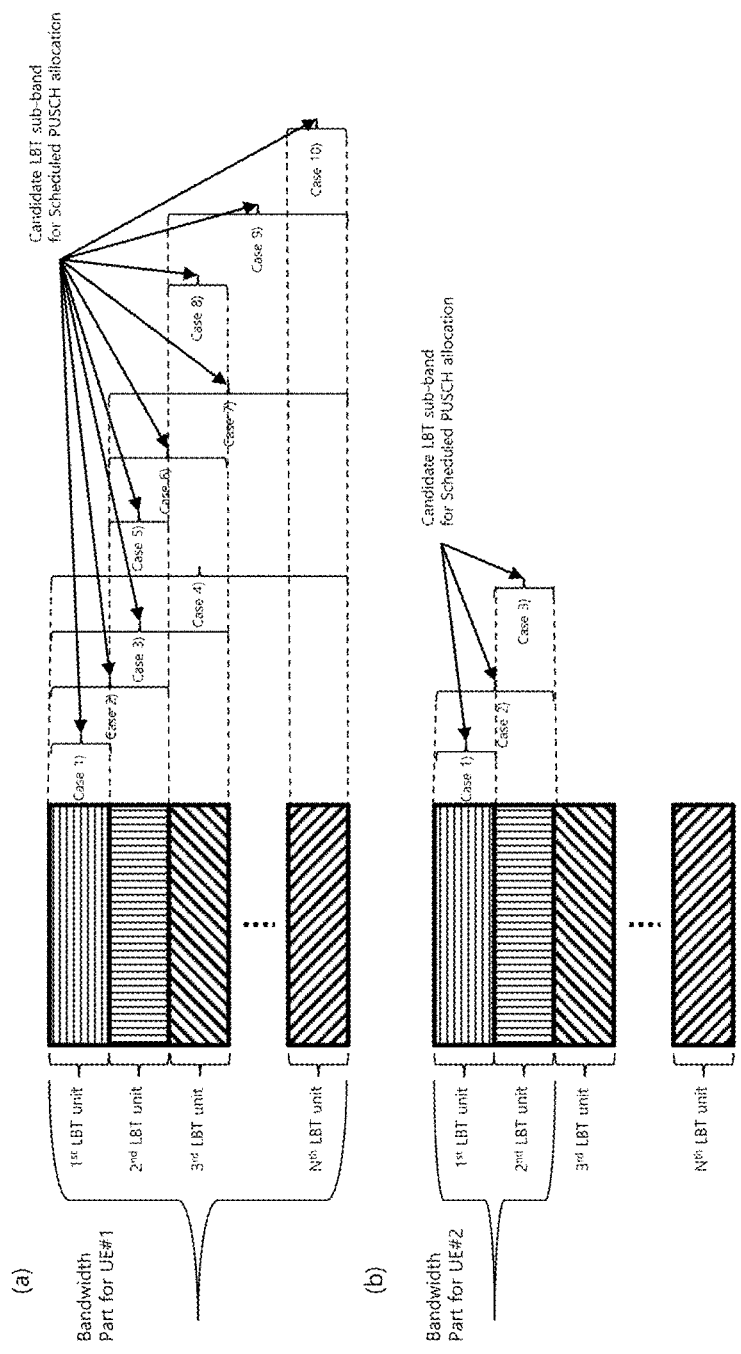
FIG. 20 illustrates an example of a structure of resources for transmitting a PUSCH (Physical Uplink Shared Channel) according to an embodiment of the present disclosure.

FIG. 20 illustrates an example of a structure of resources for transmitting a PUSCH (Physical Uplink Shared Channel) according to an embodiment of the present disclosure.

Referring to FIG. 20, there may be candidate LBT subbands for transmitting an uplink PUSCH in an activated BWP having multiple LBT subbands in one or more BWPs allocated to the UE.

Specifically, a channel access method in the uplink to perform a BWP-based operation in one carrier for NR-U may consider the following four methods.

First, the base station configures one or more BWPs for uplink transmission to the UE and activates at least one of the BWPs. When uplink channel access has succeeded in one or more of the one or more BWPs, the UE may transmit the PUSCH in the one or more BWPs in which the channel access has succeeded.

At this time, the base station may inform the UE of information on one or more activated BWPs in which the base station intends to perform uplink transmission by the UE among the activated BWPs through implicit or explicit signaling.

Accordingly, it is possible to prevent channel access from being unnecessarily performed in one or more activated BWPs in which transmission is not intended by the UE. That is, the base station may inform the UE of information on one or more activated BWPs in which uplink transmission is intended among the at least one activated BWP through implicit or explicit signaling.

For example, the UE may implicitly or explicitly receive information on activated BWPs to perform uplink transmission through DCI transmitted from the base station and thus recognize the activated BWPs to perform uplink transmission.

As the base station informs the UE of at least one BWP in which uplink transmission will be performed through implicit or explicit signaling, the UE may prevent an unnecessary operation of performing channel access in activated BWPs that are not allocated for uplink transmission.

Further, the base station may explicitly or implicitly inform the UE whether uplink scheduling is performed in units of LBT subbands included in the activated BWPs for uplink transmission of the UE. For example, whether to perform uplink scheduling in units of LBT subbands may be inserted into DCI and transmitted to the UE.

Accordingly, even when a plurality of LBT subbands are included in one activated BWP, channel access may be performed only in at least one LBT subband scheduled and allocated for PUSCH transmission among the plurality of LBT subbands.

The UE may determine whether to transmit the PUSCH according to whether the channel access is successful or not.

In order to explicitly transmit information on one or more activated BWPs to the UE, the base station may insert the information into a UL grant and transmit the UL grant and, in order to transmit information on LBT subbands scheduled and allocated for PUSCH transmission in one activated BWP to the UE through explicit signaling, may insert the information into the UL grant and transmit the UL grant.

That is, the base station may transmit activated BWPs for uplink transmission and LBT subbands scheduled and allocated for uplink transmission within the BWPs to the UE through an indicator (indication).

For example, the activated BWP for PUSCH transmission and the LBT subbands allocated through scheduling for PUSCH transmission may be indicated to the UE through the indicator included in the DCI.

Further, the activated BWPs for PUSCH transmission and the LBT subbands allocated through scheduling for PUSCH transmission may be indicated to the UE through the bit-map scheme, or the base station may indicate each case, in which the LBT subbands are allocated, to the UE in order to continuously allocate the LBT subbands as illustrated in FIG. 20. For example, the base station may transmit an indicator including a start index and a length of continuously allocated subbands to the UE, and the UE may recognize the continuously allocated LBT subbands on the basis of the start index and the length of the subbands included in the indicator transmitted from the base station. When the UE performs the LBT operation in the recognized subbands and has succeeded in channel access, the UE may transmit the PUSCH.

Second, the base station configures one or more BWPs for uplink transmission to the UE and activates some or all of the BWPs. When uplink channel access has succeeded in one or more BWPs among activated BWPs, the UE may transmit the PUSCH in one of the one or more BWPs in which the channel access has succeeded.

At this time, the base station may inform the UE of information on one or more activated BWPs in which the base station intends to perform uplink transmission by the UE among the activated BWPs through implicit or explicit signaling. Accordingly, it is possible to prevent channel access from being unnecessarily performed in one or more activated BWPs in which transmission is not intended by the UE. That is, the base station may inform the UE of information on one or more activated BWPs in which uplink transmission is intended among the at least one activated BWP through implicit or explicit signaling.

For example, the UE may implicitly or explicitly receive information on activated BWPs to perform uplink transmission through DCI transmitted from the base station and thus recognize the activated BWPs to perform uplink transmission.

As the base station informs the UE of one BWP in which uplink transmission will be performed through implicit or explicit signaling, the UE may prevent an unnecessary operation of performing channel access in activated BWPs that are not allocated for uplink transmission.

Further, the base station may explicitly or implicitly inform the UE whether uplink scheduling is performed in units of LBT subbands included in the activated BWPs for uplink transmission of the UE. For example, whether to perform uplink scheduling in units of LBT subbands may be inserted into the DCI and transmitted to the UE.

Accordingly, even when a plurality of LBT subbands are included in one activated BWP, channel access may be performed only in at least one LBT subband scheduled and allocated for PUSCH transmission among the plurality of LBT subbands.

The UE may determine whether to transmit the PUSCH according to whether the channel access is successful or not.

The base station may use the UL grant to explicitly transmit information on one or more activated BWPs to the UE, and may use the UL grant to transmit information on LBT subbands scheduled and allocated for PUSCH transmission in one activated BWP to the UE through explicit signaling.

That is, the base station may transmit activated BWPs for uplink transmission and LBT subbands scheduled and allocated for uplink transmission within the BWPs to the UE through an indicator (indication).

For example, the activated BWP for PUSCH transmission and the LBT subbands allocated through scheduling for PUSCH transmission may be indicated to the UE through the indicator included in the DCI.

Further, the activated BWPs for PUSCH transmission and the LBT subbands allocated through scheduling for PUSCH transmission may be indicated to the UE through the bit-map scheme, or the base station may indicate each case, in which the LBT subbands are allocated, to the UE in order to continuously allocate the LBT subbands as illustrated in FIG. 20. For example, the base station may transmit an indicator including a start index and a length of continuously allocated subbands to the UE, and the UE may recognize the continuously allocated LBT subbands on the basis of the start index and the length of the subbands included in the indicator transmitted from the base station. When the UE performs the LBT operation in the recognized subbands and has succeeded in channel access, the UE may perform uplink transmission.

Third, the base station configures one or more BWPs for uplink transmission to the UE and activates one of the BWPs. When channel access has succeeded in all of one or more LBT subbands configured and included in one activated BWP, the UE may transmit the PUSCH to the base station in the corresponding BWP.

At this time, the base station may inform the UE of information on activated BWPs, in which the base station intends to perform uplink transmission by the UE, through implicit or explicit signaling. Further, the base station may explicitly or implicitly inform the UE whether uplink scheduling is performed in units of LBT subbands included in the activated BWPs for uplink transmission of the UE. Accordingly, as the UE performs channel access only in LBT subbands scheduled and allocated for PUSCH transmission among a plurality of LBT subbands included in one activated BWP, a method of determining whether to transmit the PUSCH according to whether channel access in one or a plurality of LBT subbands allocated to each UE in the BWP has succeeded or not may be used.

In order to explicitly transmit information on activated BWP to the UE, the base station may insert the information into a UL grant and transmit the UL grant and, in order to transmit information on LBT subbands scheduled and allocated for PUSCH transmission in one activated BWP to the UE through explicit signaling, may insert the information into the UL grant and transmit the UL grant.

That is, the base station may transmit activated BWPs for uplink transmission and LBT subbands scheduled and allocated for uplink transmission within the BWPs to the UE through an indicator (indication).

For example, the activated BWP for PUSCH transmission and the LBT subbands allocated through scheduling for PUSCH transmission may be indicated to the UE through the indicator included in the DCI.

Further, the activated BWPs for PUSCH transmission and the LBT subbands allocated through scheduling for PUSCH transmission may be indicated to the UE through the bit-map scheme, or the base station may indicate each case, in which the LBT subbands are allocated, to the UE in order to continuously allocate the LBT subbands as illustrated in FIG. 20. For example, the base station may transmit an indicator including a start index and a length of continuously allocated subbands to the UE, and the UE may recognize the continuously allocated LBT subbands on the basis of the start index and the length of the subbands included in the indicator transmitted from the base station. When the UE performs the LBT operation in the recognized subbands and has succeeded in channel access, the UE may perform uplink transmission.

When a single BWP has a bandwidth (BW) larger than 20 MHz that is a basic unit to perform the LBT operation, whether channel access has succeeded in the activated BWP may be determined on the basis of the configuration of BWPs and whether CCA has succeeded in LBT subbands.

Specifically, when the BWP includes one or more LBT subbands and CCA is all succeeded in one or more LBT subbands allocated for PUSCH transmission through the UL grant, it may be determined that CCA in the BWP for PUSCH transmission has succeeded and the UE may perform PUSCH transmission in LBT subbands included in the BWP in which the CCA has succeeded.

However, in the case in which it is determined that the CCA has succeeded in the BWP only when the CCA has succeeded in all LBT subbands, even though channel access has succeeded in some LBT subbands and the channel is in the idle state, PUSCH transmission may be not possible if the CCA has failed in the remaining LBT subbands.

That is, even though channel access in some LBT subband units has succeeded among one or more LBT subbands allocated for PUSCH transmission to the UE by the base station through the UL grant among activated BWPs and thus the channel is in the idle state, if channel access in the remaining other LBT subbands included in the activated BWPs has failed, PUSCH transmission in all the activated BWPs may be impossible. In this case, uplink spectrum efficiency may be reduced and the size of a bandwidth in a frequency unit of the BWP may become larger and, when a plurality of LBT subbands are allocated for PUSCH transmission, a plurality of channel access has succeeded in channels in units of 20 MHz that is the LBT subband unit are needed more, and thus a success probability of the channel access in the corresponding activated BWPs may be reduced and a probability of transmission in the activated BWPs may be reduced.

However, when there is no separate mechanism for determining (or recognizing) which LBT subband has succeeded in uplink channel access among the LBT subbands allocated to the UE by the base station for PUSCH transmission, the base station may determine (or recognize) whether the UE succeeded LBT for PUSCH transmission only through detection in LBT subbands corresponding to resources for PUSCH transmission allocated to the UE by the base station.

However, the base station cannot determine or recognize whether DTX is performed in the case in which LBT has succeeded and then PUSCH transmission is performed and the case in which LBT has failed and PUSCH transmission is not performed. Accordingly, when the UE transmits the PUSCH, the base station may detect a front-loaded UL (Uplink) DMRS (Dedicated Demodulation Reference Signal) and thus recognize (or determine) an LBT subband in which the UE succeeded channel access among LBT subbands allocated for PUSCH transmission and also determine whether DTX is performed in the case in which the UE successes LBT and then performs transmission and the case in which the UE fails in LBT and does not perform PUSCH transmission.

Further, when UL transmission is performed through a configured grant, the base station cannot transmit an indicator for indicating an LBT subband within a BWP to the UE through the UL grant. Accordingly, in this case, when the UE has succeeded in uplink channel access in an LBT subband among the LBT subbands in activated BWPs configured in the UE in time resources configured through RRC, the UE may be configured to perform UL transmission by the configured grant through the corresponding LBT subband.

However, in order to perform transmission in the LBT subband unit in the case of UL transmission through the configured grant, frequency resources should be configured in units of LBT subbands and channel access in at least one of the one or more LBT subbands included in one activated BWP should be succeeded.

At this time, when channel access has succeeded only in an LBT subband to which UL transmission by the UL grant is allocated, the UL transmission by the UL grant is prioritized and thus UL transmission by the configured grant may not be performed. The base station may determine whether the configured grant is transmitted by performing not only detection in LBT subbands to which UL transmission by the UL grant is allocated but also detection of the front-loaded UL DMRS in LBT subbands to which UL transmission by the UL grant is not allocated within the activated BWP in time domain resources configured to transmit the configured grant.

Fourth, the base station configures one or more BWPs for uplink transmission to the UE and activates one of the BWPs. When channel access has succeeded in all or some of the LBT subbands configured and included in one activated BWP, the UE may transmit the PUSCH to the base station in the corresponding BWP.

At this time, the base station may inform the UE of information on activated BWPs, in which the base station intends to perform uplink transmission by the UE, through implicit or explicit signaling. Further, the base station may explicitly or implicitly inform the UE whether uplink scheduling is performed in units of LBT subbands included in the activated BWPs for uplink transmission of the UE. Accordingly, as the UE performs channel access only in LBT subbands scheduled and allocated for PUSCH transmission among a plurality of LBT subbands included in one activated BWP, a method of determining whether to transmit the PUSCH according to whether channel access in one or a plurality of LBT subbands allocated to each UE in the BWP has succeeded or not may be used.

In order to explicitly transmit information on one activated BWP to the UE, the base station may insert the information into a UL grant and transmit the UL grant and, in order to transmit information on LBT subbands scheduled and allocated for PUSCH transmission in one activated BWP to the UE through explicit signaling, may insert the information into the UL grant and transmit the UL grant.

That is, the base station may transmit activated BWPs for uplink transmission and subbands scheduled and allocated for uplink transmission within the BWPs to the UE through an indicator (indication).

For example, the activated BWP for PUSCH transmission and the LBT subbands allocated through scheduling for PUSCH transmission may be indicated to the UE through the indicator included in the DCI.

Further, the activated BWPs for PUSCH transmission and the LBT subbands allocated through scheduling for PUSCH transmission may be indicated to the UE through the bit-map scheme, or the base station may indicate each case, in which the LBT subbands are allocated, to the UE in order to continuously allocate the LBT subbands as illustrated in FIG. 20. For example, the base station may transmit an indicator including a start index and a length of continuously allocated subbands to the UE, and the UE may recognize the continuously allocated LBT subbands on the basis of the start index and the length of the subbands included in the indicator transmitted from the base station. When the UE performs the LBT operation in the recognized subbands and has succeeded in channel access, the UE may perform uplink transmission.

When a single BWP has a bandwidth (BW) larger than 20 MHz that is a basic unit to perform the LBT operation, whether channel access has succeeded in the activated BWP may be determined on the basis of the configuration of BWPs and whether CCA has succeeded in LBT subbands.

Specifically, when the BWP includes one or more LBT subbands and CCA is all or partially succeeded in one or more LBT subbands allocated for PUSCH transmission through the UL grant, it may be determined that CCA in the BWP for PUSCH transmission has succeeded and the UE may perform PUSCH transmission in LBT subbands included in the BWP in which the CCA has succeeded.

Further, when channel access in some LBT subband units has succeeded among one or more LBT subbands allocated for PUSCH transmission to the UE by the base station through the UL grant among activated BWPs and thus the channel is in the idle state, PUSCH transmission in some of the LBT subbands allocated for PUSCH transmission, in which channel access has succeeded, may be performed.

However, the UE may fail in channel access in some of the LBT subbands allocated for PUSCH transmission and thus PUSCH transmission therein may not be performed. Accordingly, the base station may configure resources for PUSCH transmission to be allocated in units of LBT subbands, so that the PUSCH can be transmitted from the UE only in some LBT subbands, and even though the PUSCH is transmitted only in some LBT subbands, the base station can receive the PUSCH transmitted in the corresponding LBT subbands.

However, when there is no separate mechanism for determining which LBT subband has succeeded in uplink channel access among the LBT subbands allocated to the UE by the base station for PUSCH transmission, the base station may determine whether the LBT has succeeded for PUSCH transmission of the UE only through detection in LBT subbands corresponding to resources for PUSCH transmission allocated to the UE by the base station.

At this time, the base station cannot determine or recognize whether DTX is performed in the case in which LBT has succeeded and then PUSCH transmission is performed and the case in which LBT has failed and PUSCH transmission is not performed. Accordingly, when the UE transmits the PUSCH, the base station may detect a front-loaded UL (Uplink) DMRS (Dedicated Demodulation Reference Signal) and thus recognize (or determine) an LBT subband in which the UE succeeded channel access among LBT subbands allocated for PUSCH transmission and also determine whether DTX is performed in the case in which the UE successes LBT and then performs transmission and the case in which the UE fails in LBT and does not perform PUSCH transmission.

Further, when UL transmission is performed through a configured grant, the base station cannot transmit an indicator for indicating an LBT subband within a BWP to the UE through the UL grant. Accordingly, in this case, when the UE has succeeded in uplink channel access in an LBT subband among the LBT subbands in activated BWPs configured in the UE in time resources configured through RRC, the UE may be configured to perform UL transmission by the configured grant through the corresponding LBT subband.

However, in order to perform transmission in the LBT subband unit in the case of UL transmission through the configured grant, frequency resources should be configured in units of LBT subbands and channel access in at least one of the one or more LBT subbands included in one activated BWP should be succeeded.

At this time, when channel access has succeeded only in an LBT subband to which UL transmission by the UL grant is allocated, the UL transmission by the UL grant is prioritized and thus UL transmission by the configured grant may not be performed. The base station may determine whether the configured grant is transmitted by performing not only detection in LBT subbands to which UL transmission by the UL grant is allocated but also detection of the front-loaded UL DMRS in LBT subbands to which UL transmission by the UL grant is not allocated within the activated BWP in time domain resources configured to transmit the configured grant.

<Resource Allocation Method when One or More LBT Sub-Bands are Included in One BWP>

Figure 21:
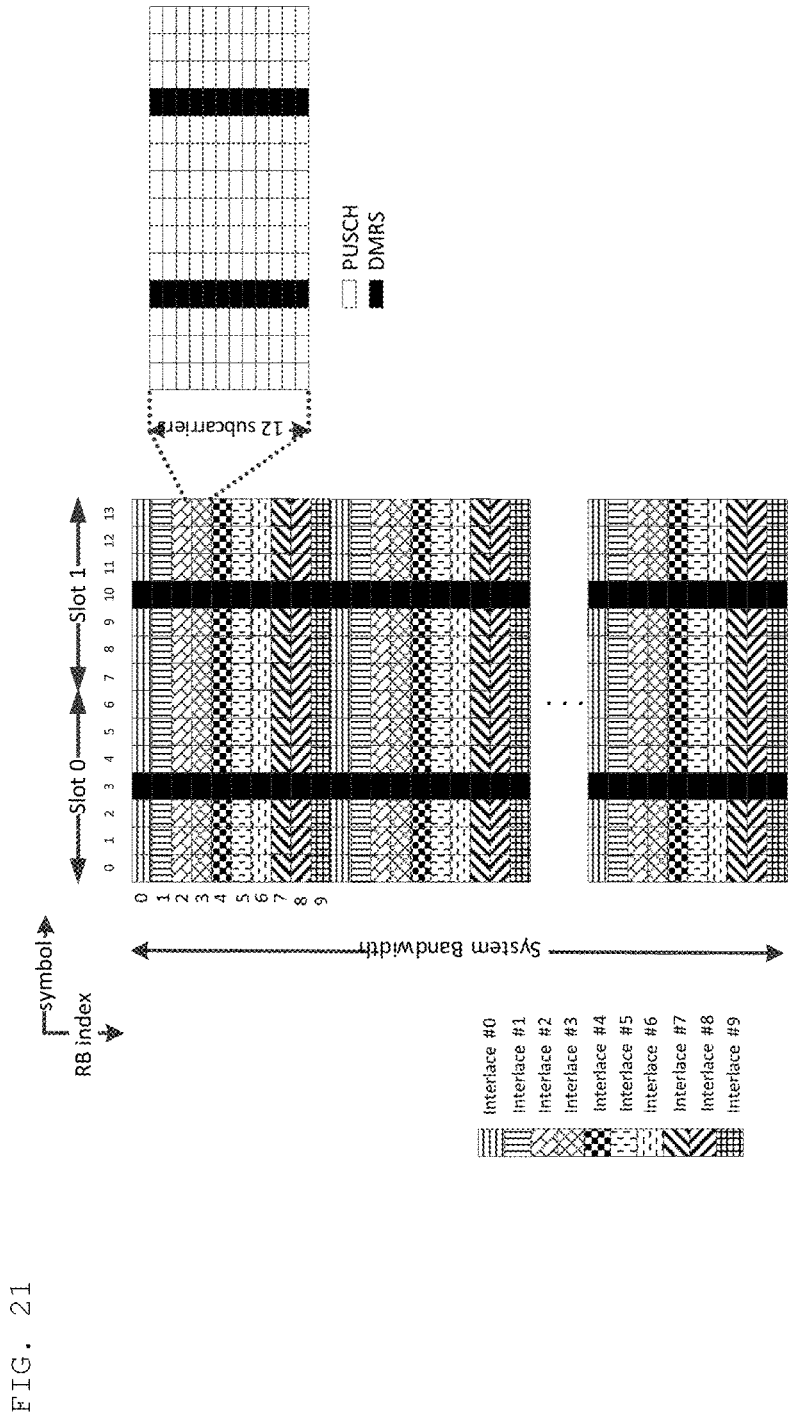
FIG. 21 illustrates an example of an interlace structure for allocating uplink resources in LTE-LAA.

FIG. 21 illustrates an example of an interlace structure for allocating uplink resources in LTE-LAA.

Referring to FIG. 21, in an NR-U operation, one BWP may include one or more LBT sub-bands (or LBT units, subbands) to perform the LBT operation for channel access.

Specifically, in order to use an unlicensed band in the case of uplink transmission, an OCBB (Occupied Channel Bandwidth) requirement defined and required in the corresponding unlicensed band should be satisfied.

For example, uplink transmission has a condition in which 80% of nominal channel bandwidths should be satisfied. In order to satisfy the condition, PRBs may be configured to be uniformly spread to the entire bandwidths at the same PRB interval in LTE-LAA as illustrated in FIG. 21.

For example, 10 different interlace indexes may be configured using a 10 interlaced structure at 10 PRBs in the system bandwidth, and the respective PRBs may be configured to be allocated over the entire channel bandwidth for each of the allocated indexes.

Such a PRB structure may be called an interlaced structure, and the interlaced structure may be used to satisfy the OCB requirement in the NR-U operation using the unlicensed band based on NR.

Accordingly, when the requirement is not satisfied, uplink or downlink data transmission may not be performed using the unlicensed band.

Therefore, the present disclosure proposes a method of transmitting and receiving data through the unlicensed band while satisfying the OCB requirement based on NR.

That is, when one BWP includes one or more LBT subbands (or LBT units) in the NR-U-based operation in which uplink data or downlink data is transmitted using the unlicensed band based on NR, a method of allocating resources for uplink data transmission is proposed.

Figure 22:
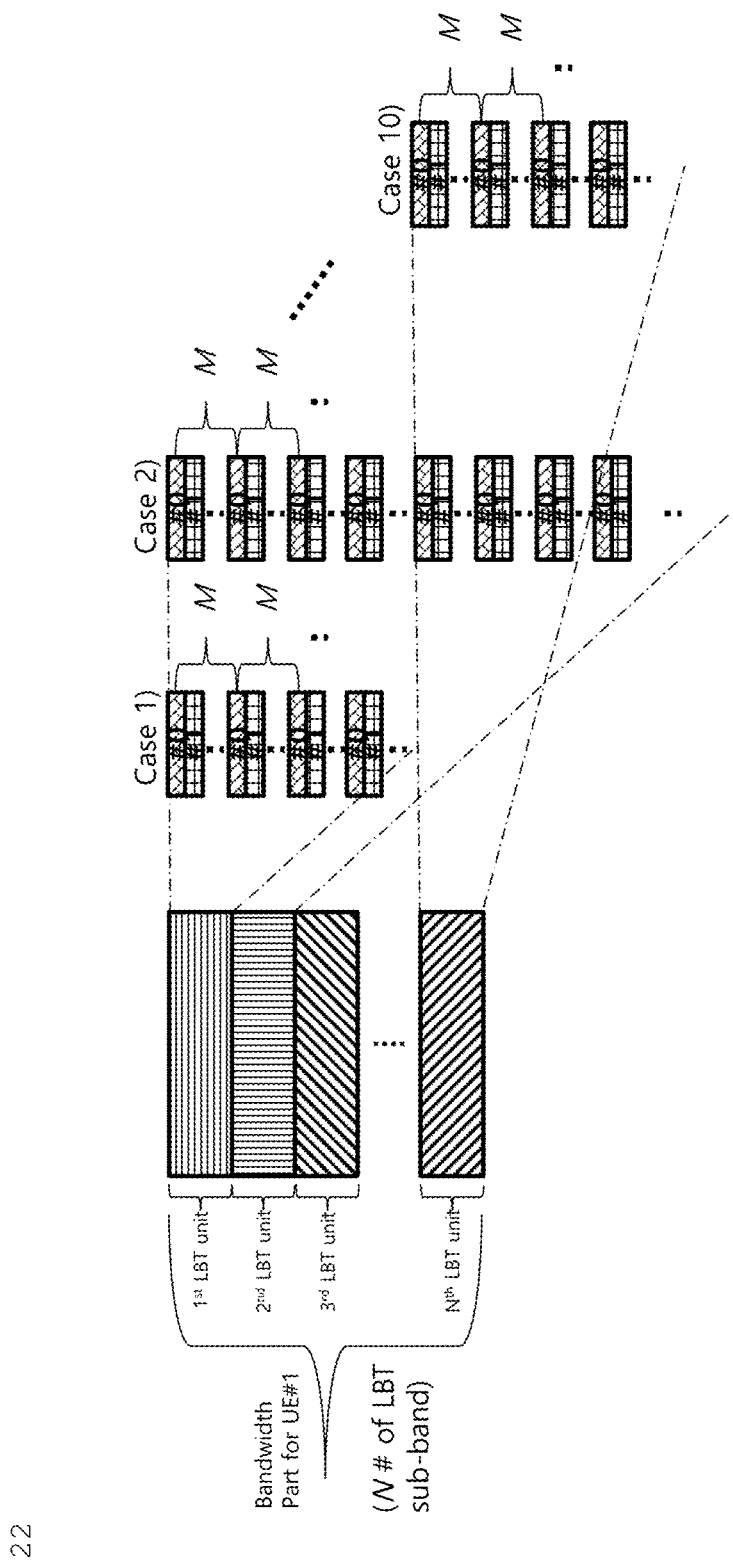
FIG. 22 illustrates an example of candidate LBT subbands for uplink PUSCH transmission in an activated BWP having multiple LBT (Listen Before Talk) sub-bands among one or more bandwidth parts (BWPs) and an interlace structure therefor.

FIG. 22 illustrates an example of candidate LBT subbands for uplink PUSCH transmission in an activated BWP having multiple LBT (Listen Before Talk) sub-bands among one or more bandwidth parts (BWPs) and an interlace structure therefor.

Referring to FIG. 22, in order to satisfy the OCB that is the requirement of the unlicensed band to use the unlicensed band, the base station may allocate LBT subbands included in the activated BWP and PRBs at regular intervals and inform the UE of locations of the allocated LBT subbands and PRBs.

Specifically, as illustrated in FIG. 20, sizes of BWPs configured for respective UEs may be different, and PRBs allocated to each UE may be allocated within the activated BWP at regular intervals.

For example, as illustrated in FIG. 22, the number of LBT subbands included in one BWP may be defined as N and an interval between different RBs having the interlaced structure within the LBT subbands in the frequency domain in one interlaced structure may be defined as M. At this time, M may be the same or may vary depending on different subcarrier spacing (SCS) values. For example, when different SCS values 15 kHz and 30 kHz are used, 10 or 11 may be used as M for 15 kHz and 5 may be used as M for 30 kHz.

First, in the case of uplink data transmission, the UE may receive resource allocation information for frequency resources for uplink data transmission from the base station. In this case, the base station may allocate uplink frequency resources to the UE and allocate resources for uplink transmission by using the interlaced structure only in continuously allocated LBT subbands. Alternatively, the base station may allocate resources for uplink transmission to the UE by using the interlaced structure in each of the allocated LBT subband(s) regardless of whether the LBT subbands are continuously allocated or non-continuously allocated.

When one BWP includes one or more LBT subbands for the NR-U operation and due to flexibility of scheduling by the base station in uplink transmission of the UE and failure in LBT for channel access in a specific LBT subband of the UE, both a non-successive LBT subband allocation scheme and a successive LBT subband allocation scheme may be used. In this case, the base station may inform the UE of allocation information of non-successive LBT subbands or allocation information of successive LBT subbands for uplink transmission.

At this time, the base station may transmit an indicator (indication) to indicate the allocated LBT subbands and the interlaced structure of the LBT subbands to the UE, and the LBT subbands and the interlaced structure may be encoded together or separately and transmitted to the UE.

A bit-map scheme or an RIV scheme may be used as the indicator for informing the UE of the LBT subbands and the interlaced structure. For example, the base station may inform of a detailed location of each of the LBT subbands through the indicator and inform of the interlaced structure in the LBT subbands through each bit using the bit-map scheme. Alternatively, the base station may inform the UE of a start location and a length of the LBT subbands through the indicator and of a start interlaced index and length by the interlaced structure.

That is, the base station may inform the UE of locations of the continuously allocated LBT subbands and indexes (or locations) of PRBs having the interlaced structure through the bit-map scheme or the RIV scheme.

Specifically, the base station may allocate successive LBT subbands allocated to perform the LBT operation to allow the UE to perform uplink transmission in the unlicensed band and PRBs in each LTE subband to have the interlaced structure at regular intervals.

The base station may encode information related to locations of the continuously allocated LBT subbands and information (for example, indexes or the like) related to PRBs having the interlaced structure together or separately and transmit the same to the UE. At this time, the information encoded together or separately may be transmitted through DCI. At this time, the DCI may further include an indicator indicating whether the PRBs of the BWP have the interlaced structure.

The base station may transmit information related to the locations of the continuously allocated LBT subbands and information related to PRBs having the interlaced structure (for example, indexes or the like) to the UE through DCI by using the bit-map scheme or the RIV scheme, and the RIV or bit-map scheme may be selectively used according to a specific condition.

For example, when the specific condition is subcarrier spacing, the bit-map scheme or the RIV scheme may be selectively used according to value of the subcarrier spacing.

For example, when subcarrier spacing is 15 kHz, the base station may encode locations of continuously allocated LBT subbands and indexes of PRBs having the interlaced structure together or separately through the RIV scheme and transmit the same to the UE through DCI.

That is, the base station may encode start locations of the continuously allocated LBT subbands and lengths (or locations) of the continuously allocated LBT subbands and transmit the same to the UE through DCI. Further, the base station may encode information indicating a start index of PRBs having the interlaced structure and a length index of the continuously allocated PRBs separately from information related to locations of the continuously allocated LBT subbands and insert the same into DCI or may encode the information together with the information related to the locations of the continuously allocated LBT subbands and insert the same into DCI, and transmit the DCI to the UE.

Alternatively, when subcarrier spacing is 15 kHz, the base station may encode locations of continuously allocated LBT subbands and indexes of PRBs having the interlaced structure together or separately through the bitmap scheme and transmit the same to the UE through DCI.

That is, the base station may encode start locations of the continuously allocated LBT subbands and lengths (or locations) of the continuously allocated LBT subbands and transmit the same to the UE through DCI. Further, the base station may encode information indicating start indexes of PRBs having the interlaced structure and a length index of the continuously allocated PRBs separately from information related to locations of the continuously allocated LBT subbands and insert the same into DCI or may encode the information together with the information related to the locations of the continuously allocated LBT subbands and insert the same into DCI, and transmit the DCI to the UE.

Alternatively, when subcarrier spacing is 30 kHz, the base station may indicate a start location and a length of the continuously allocated LBT subbands through the RIV scheme and may encode indexes of PRBs having the interlaced structure separately or together to have full flexibility through the bitmap scheme and transmit the encoded information to the UE through DCI.

That is, the base station may encode the start location and the length of the continuously allocated LBT subbands through the RIV scheme, insert the same into DCI, and transmit the DCI to the UE. Further, the base station may indicate indexes of PRBs having the interlaced structure allocated to the UE through specific bits. Specific bits having the indexes of PRBs having the interlaced structure may be encoded separately from location information of the LBT subbands encoded through the RIV scheme, inserted into DCI, and transmitted to the UE.

Alternatively, when subcarrier spacing is 30 kHz, the base station may indicate a start location and a length of the continuously allocated BLT subbands through the RIV scheme and may encode indexes of PRBs having the interlaced structure separately or together through the RIV scheme and transmit the encoded information to the UE through DCI.

That is, the base station may encode the start location and the length of the continuously allocated LBT subbands through the RIV scheme, insert the same into DCI, and transmit the DCI to the UE. Further, the base station may indicate indexes of PRBs having the interlaced structure allocated to the UE through the RIV, and may encode the specific bits separately from location information of the LBT subbands encoded through the RIV scheme, insert the same into DCI, and transmit the DCI to the UE.

Alternatively, when subcarrier spacing is 30 kHz, the base station may encode locations of continuously allocated LBT subbands and indexes of PRBs having the interlaced structure together or separately through the bitmap scheme and transmit the same to the UE through DCI.

That is, the base station may indicate locations of the continuously allocated LBT subbands using bits having the specific size through the bitmap scheme, and the bits having the specific size may be inserted into DCI and transmitted to the UE. Further, the base station may indicate the indexes of PRBs having the interlaced structure allocated to the UE through specific bits, and may separately encode the specific bits, insert the same into DCI, and transmit the DCI to the UE.

Alternatively, locations of LBT subbands and indexes of PRBs having the interlaced structure may be mapped to each other and defined as bit values, and each of the mapped bit values may be inserted into DCI and transmitted to the UE.

When receiving the DCI including information related to the LBT subbands and the PRBs having the interlaced structure, the UE may recognize the LBT subbands to perform the LBT operation, and may transmit uplink data to the base station in PRBs included in the LBT subbands in which the LBT operation has succeeded after performing the LBT operation in the recognized LBT subbands.

When locations of LBT subbands are informed through the bit-map scheme, the UE may be informed that the number of allocated LBT subbands is N and of the allocated LBT subbands using the bitmap having the length N in scheduling information through DCI. Further, M(M+1)/2 states for allocating interlaced indexes related to one or more successive PRBs in the interlaced structure of each subband may be needed. In order to indicate the states for allocating the interlaced indexes through bits, log 2{M(M+1)/2} bits or more may be needed. Accordingly, floor(log 2{M(M+1)/2}) or ceiling(log 2{M(M+1)/2}) bits may be needed to indicate the interlaced indexes of the PRBs.

When non-successive LBT subband allocation is allocated, N bit(s)+ceiling(log 2{M(M+1)/2}) (or floor(log 2{M(M+1)/2}) bits may be needed to allocate resources for uplink transmission.

For the NR-U operation, one BWP may include one or more LBT subbands, the base station may allocate resources for uplink transmission on the basis of the interlaced structure in successive LBT subbands in order for the UE to receive uplink frequency resources from the base station, and the UE may receive the resources therethrough.

When uplink frequency resources are allocated only through successive LBT subbands, the base station may indicate allocated resources to the UE through a method used for the scheme of allowing allocation of resources of non-successive subbands described above.

That is, when locations of LBT subbands are informed through the bit-map scheme, the UE may be informed that the number of allocated LBT subbands is N and of the allocated LBT subbands using the bitmap having the length N in scheduling information through DCI. Further, M(M+1)/2 states for allocating interlaced indexes related to one or more successive PRBs in the interlaced structure of each subband may be needed. In order to indicate the states for allocating the interlaced indexes through bits, log 2{M(M+1)/2} bits or more may be needed. Accordingly, floor(log 2{M(M+1)/2}) or ceiling(log 2{M(M+1)/2}) bits may be needed to indicate the interlaced indexes of the PRBs.

When resources for uplink transmission are allocated using the interlaced structure only in the successive LBT subbands, if indexes of the interlaced structure of LBT subbands and PRBs are individually separately indicated to the UE, the number of LBT subbands included in one BWP is larger and a value of M in the interlaced structure of the subbands is larger, and thus the number of states for uplink resource allocation may become larger.

Accordingly, since the number of bits of an RA (Resource Allocation) field for allocating uplink resources increases, if the resources for uplink transmission are allocated using the interlaced structure only in successive LBT subbands and scheduled to the UE, allocation information of the LBT subbands and indexes according to allocation of the interlaced structure may be encoded together and scheduled to the UE through an indicator.

The UE may recognize locations of one or more LBT subbands and resource information of RPBs in the interfaced structure within the corresponding LBT subband(s) through the value of one RA field (for resource allocation information) included in scheduling information (or DCI) transmitted from the base station.

The UE may perform LBT for channel access for each of the recognized LBT subbands and, when the channel access has succeeded according to the LBT operation, perform uplink transmission to the base station through the corresponding resources. Hereinafter, a detailed method is described.

(Method 1)

As illustrated in FIG. 20 and FIG. 22, when only successive LBT subbands are allocated, if the number of LBT subbands is N, the number of combinations of LBT subbands which can be continuously allocated may be calculated by Equation 1 below.

$$d_{SSS}(n) = [1 - 2x_0((n+m_0) \bmod 127)][1 - 2x_1((n+m_1) \bmod 127)]$$

$$m_0 = 15 \left\lfloor \frac{N_{ID}^{(1)}}{112} \right\rfloor + 5 N_{ID}^{(2)}$$

$$m_1 = N_{ID}^{(1)} \bmod 112$$

$$0 \le n < 127$$

$$x_0(i+7) = (x_0(i+4) + x_0(i)) \bmod 2$$

Further, the number of states for allocating interlaced indexes of one or more successive PRBs in the interlaced structure may be M(M+1)/2. When M(M+1)/2 states are configured, if one or more successive LBT subbands and PRB indexes in one or more successive interlaced structures are encoded together and indicated to the UE, the number of states for one or more successive LBT subbands and PRBs in one or more successive interlaced structures may be configured as shown in Equation 2 below.

$$[\,x_0(6) \;\; x_0(5) \;\; x_0(4) \;\; x_0(3) \;\; x_0(2) \;\; x_0(1) \;\; x_0(0)\,] =$$
$$[0\; 0\; 0\; 0\; 0\; 0\; 1]$$
$$[\,x_1(6) \;\; x_1(5) \;\; x_1(4) \;\; x_1(3) \;\; x_1(2) \;\; x_1(1) \;\; x_1(0)\,] =$$
$$[0\; 0\; 0\; 0\; 0\; 0\; 1]$$

In an embodiment of FIG. 22, since the number of combinations of LBT subbands which can be continuously allocated is 10 when a value of N is 4, and a value of M is 10 when subcarrier spacing is 15 kHz, the total number of states for one or more successive LBT subbands and one or more successive interlaced structures may be 550.

In this case, compared to the case in which locations of the allocated LBT subbands are allocated separately from indexes of the PRBs allocated in the interlaced structure through the bitmap, that is, the case in which 9 reserved states are remained in 4 bits+6 bits (55 states)=10 bits and thus only 9 states can be allocated for an additional predetermined mapping method in the interlaced structure, the number of bits of the RA field for resource allocation may be the same as 10 bits. However, the simultaneous encoding method based on the size of bits of the same RA field may have 474 states left compared to the individual encoding method. That is, the simultaneous encoding method may further map 474 states compared to the individual encoding method.

Accordingly, the method of allocating resources by the base station according to a preset mapping scheme may have an effect of increasing flexibility for resource allocation. Further, compared to the method of separately encoding LBT subbands and indicating the same to the UE, the method of encoding one or more successive LBT subbands, the number of LBT subbands being larger than or equal to 5, and PRBs having one or more successive interlaced structure together and mapping the same may reduce the number of bits for resource allocation.

mapped in an order of case 1)->case 2)-> . . . ->case 10) and transmitted to the UE through an indicator.

Alternatively, the information may be sequentially mapped in an ascending order by giving a priority to the number of LBT subbands, and calculated and/or configured, and the calculated and or configured information may be transmitted to the UE through an indicator. At this time, the indicator may be transmitted while being inserted into DCI that is downlink control information for transmitting uplink scheduling information.

For example, in the case of FIG. 20, the information may be mapped in an ascending order of case 1)->case 5)->case 8)->case 10)->case 2)->case 6)->case 9)->case 3)->case 7)->case 4) by giving a priority to the number of LBT subbands and transmitted to the UE through an indicator.

The base station may calculate corresponding information on the basis of a value of M determined by the number of LBT subbands included in the BWP and subcarrier spacing, allocate resources for uplink transmission to the UE, and transmit DCI including resource allocation information related to the allocated resources to the UE.

The UE may receive the DCI including the resource allocation information and perform uplink transmission using one or more LBT subbands allocated to the UE and PRBs having one or more successive interlaced structures.

(Method 2)

The RIV scheme may be used for allocation of resources having one or more interlaced structures according to the scheme used in LTE-AAA for each of one or more LBT subbands, and a mapping pattern that is a predetermined resource mapping pattern used in LTE-AAA may be used for RIV having a value larger than or equal to M(M+1)/2.

For example, the resource mapping pattern shown in Table 4 below may be used.

TABLE 4

| M (interval between different RBs in frequency domain in one interfaced structure) | N (number of LBT subbands included in one BWP) | Number of combinations of LBT subbands which can be continuously allocated | Total number of states (bit size) for one or more successive LBT subbands and one or more successive interlaced structures | Number of remaining states |
|---|---|---|---|---|
| 15 kHz SCS | 10 | 2/4/8 | 3/10/36 | 165/550/1980 (8/10/11 bits) | 91/474/68 |
| 30 kHz SCS | 5 | 2/4/8 | 3/10/36 | 45/150/540 (6/8/10 bits) | 19/106/484 |
| 60 kHz SCS | 3 | 2/4/8 | 3/10/36 | 18/60/216 (5/6/8 bits) | 14/4/40 |

Referring to FIG. 20, one or more successive LBT subbands and successive interlaced structures for Case 1) to Case 10) may be sequentially mapped in an ascending order, and calculated and/or configured, and the calculated and/or configured information may be transmitted to the UE through an indicator. At this time, the indicator may be transmitted while being inserted into DCI that is downlink control information for transmitting uplink scheduling information.

For example, in the case of FIG. 20, one or more successive LBT subbands and PRB indexes having one or more successive interlaced structures may be sequentially

TABLE 5

| RIV − N(N + 1)/2 | $RB_{START}$ | l |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

In Table 5, $RB_{START}$ denotes a start index of continuously allocated RBs having the interlaced structure, and l indicates indexes of continuously allocated RBs having the interlaced structure.

M corresponding to an interval between different RBs in a frequency domain in one interlaced structure may be described as N=M, but is not limited thereto and may have various values.

Hereinafter, N may indicate an interval between different RBs in a frequency domain in one interlaced structure, and does not mean the number of LBT subbands described in FIGS. 19 to 22 above. That is, when uplink resource allocation type 3 used in LTE-AAA is also applied to NR-U, the predetermined resource mapping method as shown in [Table 5] may be used on the basis of indexes of PRBs having successive interlaced structures, for example, 10 interlaced structures with subcarrier spacing of 15 kHz in LBT subband units having a bandwidth of 20 MHz.

Alternatively, in addition to M(M+1)/2 states for indicating total successive interlaced structures, X (for example, X is 8 when M=10 in SCS of 15 kHz) states may be further used.

The number of X for the predetermined resource mapping additionally configured according to subcarrier spacing may have the same value or different values. Method 2 proposes a method by which the LBT subbands are also encoded and indicated while the method is equally used.

For example, Equation 1 is applied but Equation 2 may be modified to Equation 3 below and Equation 3 may be applied.

$$N^2 - \sum_{i=0}^{N-1} i \qquad \text{[Equation 1]}$$

Referring to FIG. 20, in Method 2, one or more successive LBT subbands and successive interlaced structures for Case 1) to Case 10) may be sequentially mapped in an ascending order, and calculated and/or configured, and the calculated and/or configured information may be transmitted to the UE through an indicator like in Method 1. At this time, the indicator may be included in DCI that is downlink control information and transmitted.

For example, in the case of FIG. 20, one or more successive LBT subbands and PRB indexes having one or more successive interlaced structures may be sequentially mapped in an order of case 1)->case 2)-> . . . ->case 10) and transmitted to the UE through an indicator.

Alternatively, the information may be sequentially mapped in an ascending order by giving a priority to the number of LBT subbands, and calculated and/or configured, and the calculated and or configured information may be transmitted to the UE through an indicator. At this time, the indicator may be included in DCI that is downlink control information and transmitted.

For example, in the case of FIG. 20, the information may be mapped in an ascending order of case 1)->case 5)->case 8)->case 10)->case 2)->case 6)->case 9)->case 3)->case 7)->case 4) by giving a priority to the number of LBT subbands and transmitted to the UE through an indicator.

In this case, compared to Method 1), states included in the case of Method 2 may further include X states in addition to M(M+1)/2 states for indicating the total successive interlaced structures to the UE.

Uplink Resource Allocation Type 3

Uplink resource allocation type 3 applied to an SCell of LAA may be applied for NR-U. Resource allocation information for uplink resource allocation type 3 may indicate a set of resource blocks $RB_{START}+l+i \cdot N$ allocated to the scheduled UE. A value N is as shown in Equation 4

$$\text{total \# of states for } RA = \frac{M(M+1)}{2}\left(N^2 - \sum_{i=0}^{N-1} i\right) \qquad \text{[Equation 2]}$$

When the number $N_{RB}^{UL}$ of uplink RBs is 100, a resource allocation field of a scheduling grant may include an RIV. When $N_{RB}^{UL}$ is 100 and 0≤RIV<N(N+1)/2, l=0, 1, . . . L−1 and the RIV may correspond to a start resource block ($RB_{START}$) of RBs and L(L≥1). The RIV may be defined as shown in Equation 5 below.

$$\text{total \# of states for } RA = \left(\frac{M(M+1)}{2} + X\right)\left(N^2 - \sum_{i=0}^{N-1} i\right) \qquad \text{[Equation 3]}$$

When $N_{RB}^{UL}$ is 100 and RIV≥N(N+1)/2, the RIV may correspond to a start resource block ($RB_{START}$) of RBs and Table 4.

In the methods described with reference to FIG. 19 to FIG. 22, when DFT spreading OFDM is excluded from the uplink transmission schemes, indexes that are allocated at 7 RB intervals and have the interlaced structure may be indexed and indicated to the UE through the methods described with reference to FIG. 19 to FIG. 22.

However, when the UE is configured to use DFT spreading OFDM, indexes of RBs that are allocated at 7 RB intervals and have the interlaced structure may be configured as reserved indexes.

When one BWP includes one or more LBT subbands, compared to the indicator indicating LBT subbands independently allocated for PUSCH transmission and the method of configuring and allocating PRBs in the interlaced structure, the present disclosure has an effect of reducing the number of states for indicating resource allocation information (that is, locations of one or more LBT subbands and resource allocation information of PRBs allocated within the corresponding LBT subband(s) in the interlaced structure) related to resources allocated for PUSCH transmission according to an increase in the number of LBT subbands or an increase in an interval between different RBs in a frequency domain in the interlaced structure.

Figure 23:
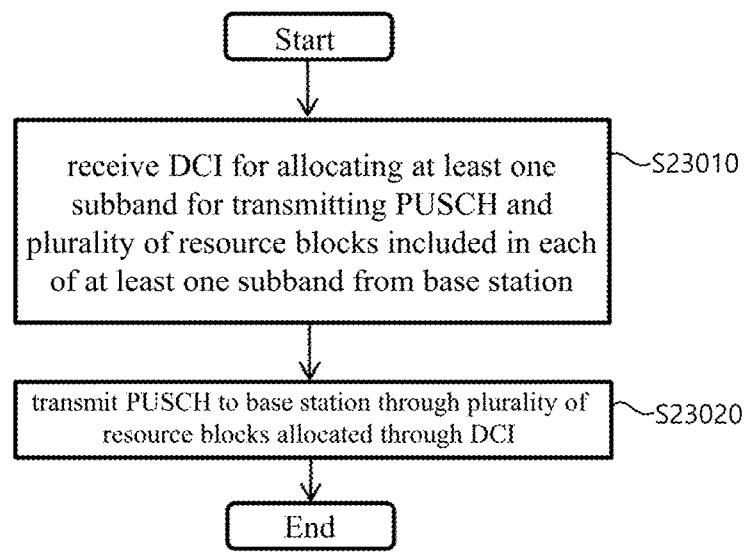
FIG. 23 is a flowchart illustrating an example of a method by which the UE receives resources of an unlicensed band from the base station and transmits uplink data according to another embodiment of the present disclosure.

FIG. 23 is a flowchart illustrating an example of a method by which the UE receives resources of an unlicensed band from the base station and transmits uplink data according to another embodiment of the present disclosure.

Referring to FIG. 23, the UE may receive allocation information indicating successive LBT subbands and allocation information indicating PRBs having the interlaced structure from the base station through downlink control information in order to transmit uplink data through an unlicensed band and transmit uplink data to the base station through the allocated LBT subbands and PRBs having the interlaced structure.

Specifically, the UE may receive Downlink Control Information (DCI) for allocating at least one subband for transmitting a PUSCH (Physical Uplink Shared Channel) and a plurality of resource blocks included in each of at least one subband from the base station in S23010.

The UE may receive RRC configuration information including parameters for receiving DCI before receiving the DCI from the base station.

A plurality of resource blocks may be allocated within a system bandwidth like in the method described with reference to FIG. 20 to FIG. 22. For example, the plurality of resource blocks may be called PRBs and may be allocated in the interlaced structure in which allocation is performed at regular intervals to occupy a predetermined portion (for example, 80%) of the system bandwidth. The plurality of PRBs having the interlaced structure may be included in allocated LBT subbands.

At this time, at least one allocated subband may be included in a bandwidth part (BWP) activated on the basis of the first resource allocation information, and at least one subband allocated for uplink transmission in one BWP may be continuously allocated.

Further, the plurality of allocated resource blocks may be included in the interlace structure in which the resource blocks are continuously allocated at regular intervals in the activated BWP on the basis of the second resource allocation information.

DCI may include first resource allocation information related to locations of at least one allocated subband and second resource allocation information related to locations of the plurality of allocated resource blocks like in the method described with reference to FIG. 20 to FIG. 22.

For example, the DCI may include second resource allocation information related to locations of a plurality of resource blocks having the interlaced structure and first resource allocation information related to locations of allocated LBT subbands, and the second resource allocation information of the plurality of resource blocks having the interlaced structure and the first resource allocation information related to the locations of the allocated LBT subbands may be encoded separately or together and included in the DCI.

At this time, the second resource allocation information of the plurality of resource blocks having the interlaced structure and the first resource allocation information related to the locations of the allocated LBT subbands may be transmitted to the UE through an indicator by the bitmap scheme or the RIV scheme as described with reference to FIG. 20 to FIG. 22.

For example, the second resource allocation information of the plurality of resource blocks having the interlaced structure and the first resource allocation information related to the locations of the allocated LBT subbands may be indicated according to a specific condition through the bitmap scheme or the RIV scheme.

At this time, in an example of the specific condition, second resource allocation information of a plurality of resource blocks having the interlaced structure and first resource allocation information related to locations of allocated LBT subbands may be transmitted to the UE through an indicator according to a value of subcarrier spacing by means of the bitmap scheme or the RIV scheme.

For example, when subcarrier spacing is 15 kHz, second resource allocation information of a plurality of resource blocks having the interlaced structure and first resource allocation information of allocated LBT subbands may be included in DCI according to the RIV scheme.

That is, a start index of the plurality of resource blocks having the interlaced structure, a value related to indexes of the continuously allocated resource blocks, a start index of the continuously allocated LBT subbands, and indexes of the continuously allocated LBT subbands may be encoded separately or together and included in the DCI.

Further, when subcarrier spacing is 15 kHz, second resource allocation information of a plurality of resource blocks having the interlaced structure and first resource allocation information of allocated LBT subbands may be transmitted to the UE through an indicator according to the bitmap scheme.

That is, detailed locations of the plurality of resource blocks having the interlaced structure and the continuously allocated LBT subbands may be encoded separately or together by a value of each bit having a specific size and included in DCI.

Alternatively, when subcarrier spacing is 30 kHz, first resource allocation information of the continuously allocated LBT subbands may be included in DCI according to the RIV scheme, and second resource allocation information of the plurality of resource blocks having the interlaced structure may be included in DCI by an indicator and transmitted to the UE.

That is, a start index of the plurality of resource blocks having the interlaced structure, a value related to indexes of the continuously allocated resource blocks, a start index of the continuously allocated LBT subbands, and indexes of the continuously allocated LBT subbands may be encoded separately or together and included in DCI.

Alternatively, when subcarrier spacing is 30 kHz, second resource allocation information of a plurality of resource blocks having the interlaced structure and first resource allocation information of allocated LBT subbands may be transmitted to the UE through an indicator according to the bitmap scheme.

That is, detailed locations of the plurality of resource blocks having the interlaced structure and the continuously allocated LBT subbands may be encoded separately or together by a value of each bit having a specific size and included in DCI.

When detailed locations of the plurality of resource blocks having the interlaced structure and the continuously allocated LBT subbands are encoded together and transmitted to the UE through an indicator, the information may be mapped to an indicator indicating indexes of the plurality of resource blocks having the interlaced structure and the continuously allocated LBT subbands, and an indicator indicating each mapping state may be included in DCI and transmitted to the UE.

Thereafter, the UE may perform channel access as the LBT operation in successive LBT subbands indicated by the DCI.

When the UE succeeds in channel access in the allocated successive LBT subbands, the UE may transmit the PUSCH to the base station through first resource allocation information indicating the successive LBT subbands and second resource allocation information of the plurality of resource blocks allocated in the interlaced structure within the LBT subbands by the DCI in S23020.

Figure 24:
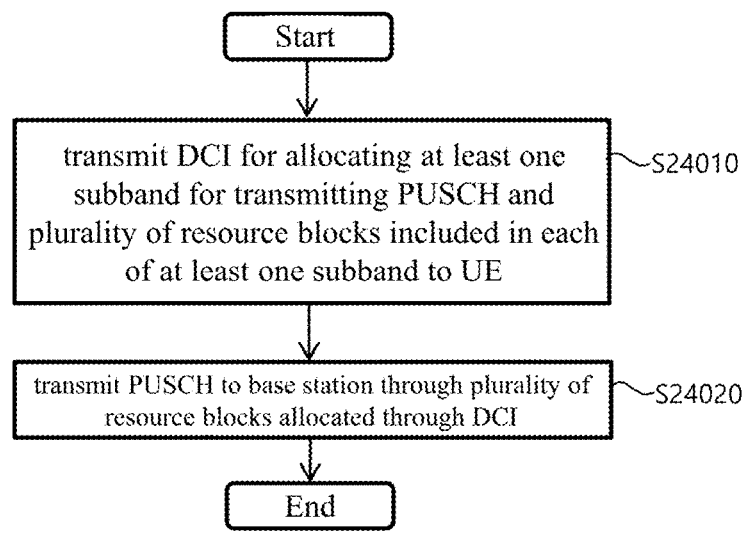
FIG. 24 is a flowchart illustrating an example of a method by which the base station allocates resources of an unlicensed band to the UE and receives uplink data according to another embodiment of the present disclosure.

When the UE fails in channel access in the allocated successive LBT subbands, the UE may not transmit the PUSCH to the base station. FIG. 24 is a flowchart illustrating an example of a method by which the base station allocates resources of an unlicensed band to the UE and receives uplink data according to another embodiment of the present disclosure.

Referring to FIG. 24, the base station may indicate allocation information indicating successive LBT subbands and allocation information indicating PRBs having the interlaced structure to the UE through downlink control information in order to receive uplink data through an unlicensed band and receive uplink data to from the UE through the allocated LBT subbands and PRBs having the interlaced structure.

Specifically, the base station may transmit Downlink Control Information (DCI) for allocating at least one subband for transmitting a PUSCH (Physical Uplink Shared Channel) and a plurality of resource blocks included in each of at least one subband to the UE in S24010.

The base station may transmit RRC configuration information including parameters for receiving DCI before receiving the DCI to the UE.

A plurality of resource blocks may be allocated within a system bandwidth like in the method described with reference to FIG. 20 to FIG. 22. For example, the plurality of resource blocks may be called PRBs and may be allocated in the interlaced structure in which allocation is performed at regular intervals to occupy a predetermined portion (for example, 80%) of the system bandwidth. The plurality of PRBs having the interlaced structure may be included in allocated LBT subbands.

At this time, at least one allocated subband may be included in a bandwidth part (BWP) activated on the basis of the first resource allocation information, and at least one subband allocated for uplink transmission in one BWP may be continuously allocated.

Further, the plurality of allocated resource blocks may be included in the interlace structure in which the resource blocks are continuously allocated at regular intervals in the activated BWP on the basis of the second resource allocation information. DCI may include first resource allocation information related to locations of at least one allocated subband and second resource allocation information related to locations of the plurality of allocated resource blocks like in the method described with reference to FIG. 20 to FIG. 22.

For example, the DCI may include second resource allocation information related to locations of a plurality of resource blocks having the interlaced structure and first resource allocation information related to locations of allocated LBT subbands, and the second resource allocation information of the plurality of resource blocks having the interlaced structure and the first resource allocation information related to the locations of the allocated LBT subbands may be encoded separately or together and included in the DCI.

At this time, the second resource allocation information of the plurality of resource blocks having the interlaced structure and the first resource allocation information related to the locations of the allocated LBT subbands may be transmitted to the UE through an indicator by the bitmap scheme or the RIV scheme as described with reference to FIG. 20 to FIG. 22.

For example, the second resource allocation information of the plurality of resource blocks having the interlaced structure and the first resource allocation information related to the locations of the allocated LBT subbands may be indicated according to a specific condition through the bitmap scheme or the RIV scheme.

At this time, in an example of the specific condition, second resource allocation information of a plurality of resource blocks having the interlaced structure and first resource allocation information related to locations of allocated LBT subbands may be transmitted to the UE through an indicator according to a value of subcarrier spacing by means of the bitmap scheme or the RIV scheme.

For example, when subcarrier spacing is 15 kHz, second resource allocation information of a plurality of resource blocks having the interlaced structure and first resource allocation information of allocated LBT subbands may be included in DCI according to the RIV scheme.

That is, a start index of the plurality of resource blocks having the interlaced structure, a value related to indexes of the continuously allocated resource blocks, a start index of the continuously allocated LBT subbands, and indexes of the continuously allocated LBT subbands may be encoded separately or together and included in DCI.

Further, when subcarrier spacing is 15 kHz, second resource allocation information of a plurality of resource blocks having the interlaced structure and first resource allocation information of allocated LBT subbands may be transmitted to the UE through an indicator.

That is, detailed locations of the plurality of resource blocks having the interlaced structure and the continuously allocated LBT subbands may be encoded separately or together by a value of each bit having a specific size and included in DCI.

Alternatively, when subcarrier spacing is 30 kHz, first resource allocation information of the continuously allocated LBT subbands may be included in DCI according to the RIV scheme, and second resource allocation information of the plurality of resource blocks having the interlaced structure may be included in DCI by an indicator and transmitted to the UE.

That is, a start index of the plurality of resource blocks having the interlaced structure, a value related to indexes of the continuously allocated resource blocks, a start index of the continuously allocated LBT subbands, and indexes of the continuously allocated LBT subbands may be encoded separately or together and included in DCI.

Alternatively, when subcarrier spacing is 30 kHz, second resource allocation information of a plurality of resource blocks having the interlaced structure and first resource allocation information of allocated LBT subbands may be transmitted to the UE through an indicator according to the bitmap scheme.

That is, detailed locations of the plurality of resource blocks having the interlaced structure and the continuously LBT subbands may be encoded separately or together by a value of each bit having a specific size and included in DCI.

When detailed locations of the plurality of resource blocks having the interlaced structure and the continuously allocated LBT subbands are encoded together and transmitted to the UE through an indicator, the information may be mapped to an indicator indicating indexes of the plurality of resource blocks having the interlaced structure and the continuously allocated LBT subbands, and an indicator indicating each mapping state may be included in DCI and transmitted to the UE.

Thereafter, the base station may receive the PUSCH from the UE through the LBT subbands continuously allocated to the UE and the plurality of resource blocks allocated with the interlaced structure through the DCI in S24020.

The description according to the present disclosure is only for an example, and it may be understood by those skilled in the art that embodiments of the present disclosure can be easily changed into other detailed forms without departing from the technical idea or necessary features of the present disclosure. Therefore, the embodiments should be understood as examples but not restrictive in all aspects. For example, each element mentioned in a singular form may be implemented in a distributed manner, and also elements mentioned in a distributed form may be implemented in a combination form.

The scope of the present disclosure is defined by the appended claims rather than the detailed description, and the meaning and scope of the claims and all modifications or modified forms derived from the concept of equivalents thereof should be construed to be included in the scope of the present disclosure.

The invention claimed is:

1. A terminal configured to operate in a wireless communication system, the terminal comprising:
   a communication module; and
   a processor configured to control the communication module,
   wherein the processor is configured to,
   receive Downlink Control Information (DCI) for allocating a plurality of resource blocks (RBs) for transmitting a Physical Uplink Shared Channel (PUSCH), and
   transmit the PUSCH to the base station through the plurality of resource blocks allocated through the DCI,
   wherein the DCI includes first bits for allocating at least one resource block set including the plurality of resource blocks for transmitting the PUSCH and second bits related to an interlaced allocation for the plurality of resource blocks,
   wherein the first bits are used for allocating the at least one resource block set included in an active bandwidth part (BWP),
   wherein the second bits are used for providing at least one interlace included in the interlaced allocation for the plurality of resource blocks,
   wherein at least one resource block included in each of the at least one interlace is arranged at a specific interval in the active BWP,
   wherein the at least one resource block set is continuously allocated within the active BWP based on the first bits,
   wherein the second bits are used for indicating the at least one interlace using different schemes based on a subcarrier spacing (SCS) configured to the active BWP, and
   wherein a number of the second bits varies depending on the SCS configured to the active BWP.

2. The terminal of claim 1, wherein the first bits indicates the at least one resource block set for the plurality of resource blocks using a Resource Indication Value (RIV) scheme.

3. The terminal of claim 1, wherein the second bits are used for indicating the at least one interlace in the interlaced allocation for the plurality of resource blocks through a bitmap scheme or a RIV scheme according to the SCS.

4. The terminal of claim 3, wherein, when the SCS is 30 kHz, each of the at least one interlace in the interlaced allocation for the plurality of resource blocks is represented by a respective bit value included in the second bits based on the bitmap scheme.

5. The terminal of claim 3, wherein, when the SCS is 15 kHz, the second bits indicate a start index of the at least one interlace in the interlaced allocation for the plurality of resource blocks and a number of the at least one interlace in the interlaced allocation for the plurality of resource blocks based on the RIV scheme.

6. The terminal of claim 1, wherein the first bits are related to a start index of the at least one resource block set and a number of the at least one resource block set for allocating the at least one resource block set including the plurality of resource blocks.

7. The terminal of claim 6,
   wherein the first bits and the second bits are encoded together and included in the DCI.

8. The terminal of claim 7,
   wherein indication information in which the first bits and the second bits are encoded together is sequentially calculated in an ascending order by giving a priority to one of the at least one resource block set for the plurality of resource blocks or the interlaced allocation for the plurality of resource blocks.

9. The terminal of claim 1,
   wherein the plurality of resource blocks has an interlaced structure over the at least one resource block set in which an operation for channel access is performed.

10. A method of operating a terminal in a wireless communication system, the method comprising:
    receiving Downlink Control Information (DCI) for allocating a plurality of resource blocks (RBs) for transmitting a Physical Uplink Shared Channel (PUSCH); and
    transmitting the PUSCH to the base station through the plurality of resource blocks allocated through the DCI,
    wherein the DCI includes first bits for allocating at least one resource block set including the plurality of resource blocks for transmitting the PUSCH and second bits related to an interlaced allocation for the plurality of resource blocks,
    wherein the first bits are used for allocating the at least one resource block set included in an active bandwidth part (BWP),
    wherein the second bits are used for providing at least one interlace included in the interlaced allocation for the plurality of resource blocks,
    wherein at least one resource block included in each of the at least one interlace is arranged at a specific interval in the active BWP,
    wherein the at least one resource block set is continuously allocated within the active BWP based on the first bits,
    wherein the second bits are used for indicating the at least one interlace using different schemes based on a subcarrier spacing (SCS) configured to the active BWP, and
    wherein a number of the second bits varies depending on the SCS configured to the active BWP.

11. The method of claim 10, wherein the first bits indicates the at least one resource block set for the plurality of resource blocks using a Resource Indication Value (RIV) scheme.

12. The method of claim 10, wherein the second bits are used for indicating the at least one interlace in the interlaced allocation for the plurality of resource blocks through a bitmap scheme or a RIV scheme according to the SCS.

13. The method of claim 12, wherein, when the SCS is 30 kHz, each of the at least one interlace in the interlaced allocation for the plurality of resource blocks is represented by a respective bit value included in the second bits based on the bitmap scheme.

14. The method of claim 12, wherein, when the SCS is 15 kHz, the second bits indicate a start index of the at least one interlace in the interlaced allocation for the plurality of resource blocks and a number of the at least one interlace in the interlaced allocation for the plurality of resource blocks based on the RIV scheme.

15. The method of claim 10, wherein the first bits are related to a start index of the at least one resource block set and a number of the at least one resource block set for allocating the at least one resource block set including the plurality of resource blocks.

16. The method of claim 15,
wherein the first bits and the second bits are encoded together and included in the DCI.

17. The method of claim 16,
wherein indication information in which the first bits and the second bits are encoded together is sequentially calculated in an ascending order by giving a priority to one of the at least one resource block set for the plurality of resource blocks or the interlaced allocation for the plurality of resource blocks.

18. The method of claim 10,
wherein the plurality of resource blocks has an interlaced structure over the at least one resource block set in which an operation for channel access is performed.

19. A base station configured to operate in a wireless communication system, the base station comprising:
a communication module; and
a processor configured to control the communication module,
wherein the processor is configured to,
transmit Downlink Control Information (DCI) for allocating a plurality of resource blocks (RBs) for transmitting a Physical Uplink Shared Channel (PUSCH),
receive the PUSCH to the base station through the plurality of resource blocks allocated through the DCI,
wherein the DCI comprises first bits for allocating at least one resource block set including the plurality of resource blocks for transmitting the PUSCH and second bits related to an interlaced allocation for the plurality of resource blocks,
wherein the first bits are used for allocating the at least one resource block set included in an active bandwidth part (BWP),
wherein the second bits are used for providing the at least one interlace included in the interlaced allocation for the plurality of resource blocks,
wherein at least one resource block included in each of the at least one interlace is arranged at a specific interval in the active BWP,
wherein the at least one resource block set is continuously allocated within the active BWP based on the first bits,
wherein the second bits are used for indicating the at least one interlace using different schemes based on a subcarrier spacing (SCS) configured to the active BWP, and
wherein a number of the second bits varies depending on the SCS configured to the active BWP.

* * * * *